US010909712B2

(12) United States Patent
Bruner

(10) Patent No.: US 10,909,712 B2
(45) Date of Patent: Feb. 2, 2021

(54) PRECISION MAPPING USING AUTONOMOUS DEVICES

(71) Applicant: Microsoft Technology Licensing, LLC, Redmond, WA (US)

(72) Inventor: John David Bruner, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 137 days.

(21) Appl. No.: 15/989,916

(22) Filed: May 25, 2018

(65) Prior Publication Data

US 2019/0355145 A1 Nov. 21, 2019

Related U.S. Application Data

(60) Provisional application No. 62/674,300, filed on May 21, 2018.

(51) Int. Cl.
*H04W 84/18* (2009.01)
*G06T 7/70* (2017.01)
(Continued)

(52) U.S. Cl.
CPC .............. *G06T 7/70* (2017.01); *B64C 39/024* (2013.01); *G06T 17/05* (2013.01); *H04W 4/02* (2013.01);
(Continued)

(58) Field of Classification Search
CPC ........ H04W 4/38; H04W 4/02; H04W 84/06; H04W 84/18; B64C 2201/127; B64C 2201/00; B64C 39/024; G06T 17/05
See application file for complete search history.

(56) References Cited

U.S. PATENT DOCUMENTS 9,075,415 B2   7/2015   Kugelmass
9,745,060 B2   8/2017   O'Connor et al.
(Continued)

FOREIGN PATENT DOCUMENTS

WO   2016145411 A1   9/2016
WO   2016209504 A1   12/2016
(Continued)

OTHER PUBLICATIONS

Cledat, et al., "Mapping GNSS Restricted Environments With a Drone Tandem and Indirect Position Control", In Journal of ISPRS Annals of the Photogrammetry, Remote Sensing and Spatial Information Sciences, vol. 4, pp. 1-7, Sep. 4, 2017 (7 pages total).
(Continued)

*Primary Examiner* — Said M Elnoubi
(74) *Attorney, Agent, or Firm* — Mark K. Young; Mayer & Williams, PC

(57) ABSTRACT

Sets of drones are deployed to create an ad-hoc 5G network in a physical environment to collect sensor data and generate a map of the physical environment in real time. Master drones configured with 5G capabilities are deployed to the physical area to create the 5G ad-hoc network, and swarm drones configured with sensors are deployed to gather environmental data on the physical environment. The gathered data is transmitted to the master drones to generate a map. The deployable 5G network is leveraged to identify precise locations for the swarm drones and each instance of sensor data collected by the swarm drones in order to create an accurate and detailed map of the environment. The map can include information regarding the structural layout of the space and environmental characteristics, such as temperature, the presence of smoke or other gases, etc.

19 Claims, 18 Drawing Sheets

(51) Int. Cl.
*H04W 4/02* (2018.01)
*H04W 4/38* (2018.01)
*B64C 39/02* (2006.01)
*G06T 17/05* (2011.01)

(52) U.S. Cl.
CPC ......... *H04W 4/38* (2018.02); *B64C 2201/127* (2013.01); *G06T 2207/10032* (2013.01); *H04W 84/18* (2013.01)

(56) References Cited

U.S. PATENT DOCUMENTS

| | | | |
|---|---|---|---|
| 2015/0184348 A1* | 7/2015 | Stracke, Jr. | G01C 21/20 702/141 |
| 2016/0293018 A1* | 10/2016 | Kim | G08G 5/0082 |
| 2017/0127606 A1 | 5/2017 | Horton | |
| 2018/0094935 A1* | 4/2018 | O'Brien | G06Q 10/08 |
| 2018/0139152 A1* | 5/2018 | Shaw | H04W 84/18 |
| 2019/0139421 A1* | 5/2019 | Nilsson | B64C 39/024 |

FOREIGN PATENT DOCUMENTS

| | | |
|---|---|---|
| WO | 2017137393 A1 | 8/2017 |
| WO | 2018004681 A1 | 1/2018 |

OTHER PUBLICATIONS

Almeida, et al., "Distributed UAV-Swarm-Based Real-Time Geomatic Data Collection Under Dynamically Changing Resolution Requirements", in Journal of the International Archives of Photogrammetry, Remote Sensing and Spatial Information Sciences, vol. 42, pp. 5-12, Sep. 4, 2017 (8 pages total).

"What is 5G and why is location important?," Ordnance Survey 2018 Government & Business, Ordnance Survey Limited [GB], Retrieved from: https://www.ordnancesurvey.co.uk/business-and-government/smart/5g-os-location-data.html, Retrieved on May 25, 2018 (3 pages total).

"Positioning and Location-Awareness in Future 5G Networks," Tampere University of Technology, last updated May 18, 2018, Retrieved from: http://www.tut.fi/5G/positioning/, Retrieved on May 25, 2018 (4 pages total).

"LTE to 5G: Cellular and Broadband Innovation," Mobile Broadband Transformation, Rysavy Research for 5G Americas, Aug. 2017 (214 pages).

Akram, et al., "Security, Privacy and Safety Evaluation of Dynamic and Static Fleets of Drones", In Proceedings of IEEE/AIAA 36th Digital Avionics Systems Conference (DASC), Aug. 18, 2017, 12 Pages.

Bowkett, et al., "Operational Safety Analysis and Controller Design of a Dual Drones System", In Proceedings of International Symposium on Computer Science and Intelligent Controls (ISCSIC), Oct. 20, 2017, pp. 82-87.

Campion, et al., "A Review and Future Directions of UAV Swarm Communication Architectures", In Proceedings of IEEE International Conference on Electro/Information Technology (EIT), May 3, 2018, pp. 903-908.

Ledergerber, et al., "A Robot Self-Localization System Using One-Way Ultra-Wideband Communication", In the Proceedings of IEEE/RSJ International Conference on Intelligent Robots and Systems (IROS), Sep. 28, 2015, pp. 3131-3137.

Mendrzik, et al., "Error Bounds for Terahertz MIMO Positioning of Swarm UAVs for Distributed Sensing", in Proceedings of IEEE International Conference on Communications Workshops (ICC Workshops), May 20, 2018, pp. 1-6.

"International Search Report and Written Opinion Issued in PCT Application No. PCT/US19/031922", dated Nov. 18, 2019, 22 Pages.

Saha, et al., "A Cloud Based Autonomous Multipurpose System with Self-Communicating Bots and Swarm of Drones", In Proceedings of IEEE 8th Annual Computing and Communication Workshop and Conference (CCWC), Jan. 8, 2018, pp. 649-653.

Seiber, et al., "Tracking Hazardous Aerial Plumes Using IoT-Enabled Drone Swarms", In Proceedings of IEEE 4th World Forum on Internet of Things (WF-IOT), Feb. 5, 2018, pp. 377-382.

Wu, et al., "ADDSEN: Adaptive Data Processing and Dissemination for Drone Swarms in Urban Sensing", In the Proceedings of IEEE Transactions on Computers, vol. 66, Issue: 2, Feb. 1, 2017, pp. 183-198.

\* cited by examiner

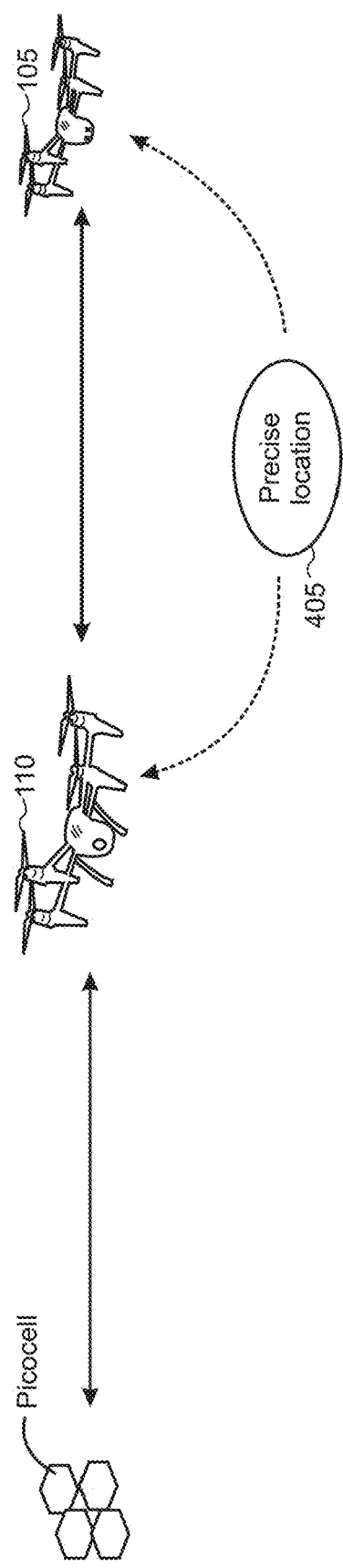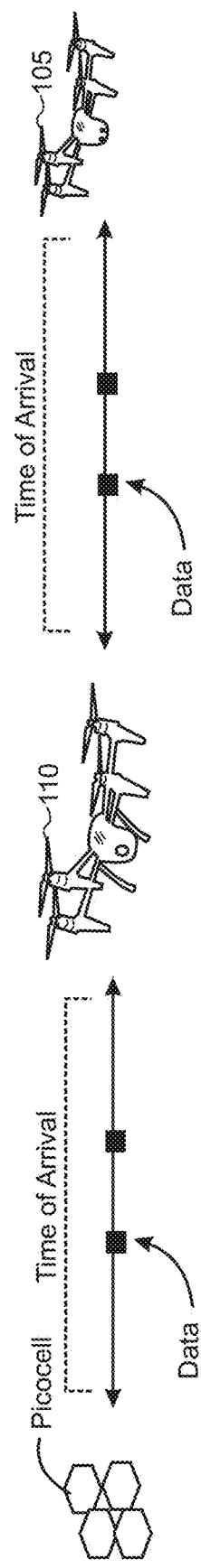

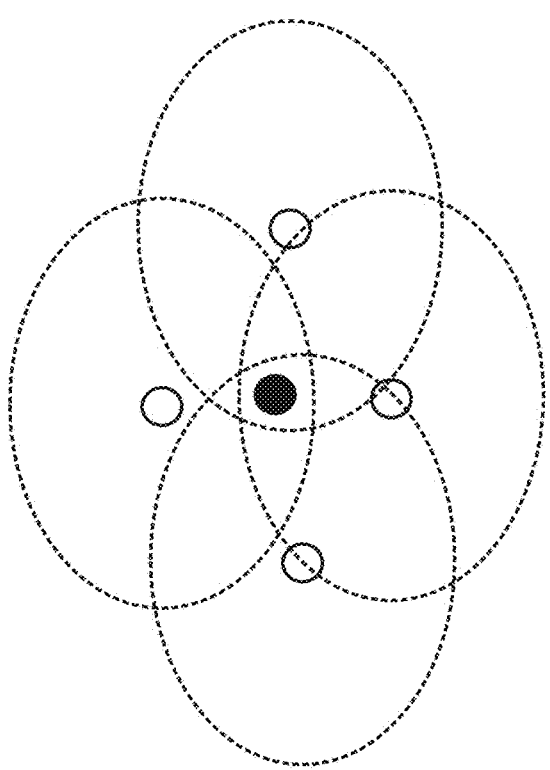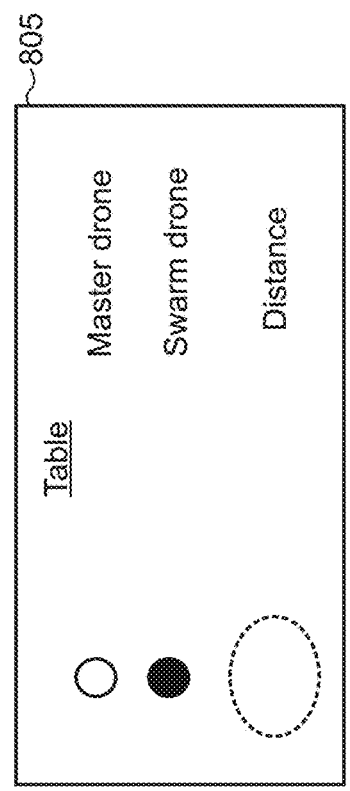
FIG 9
900
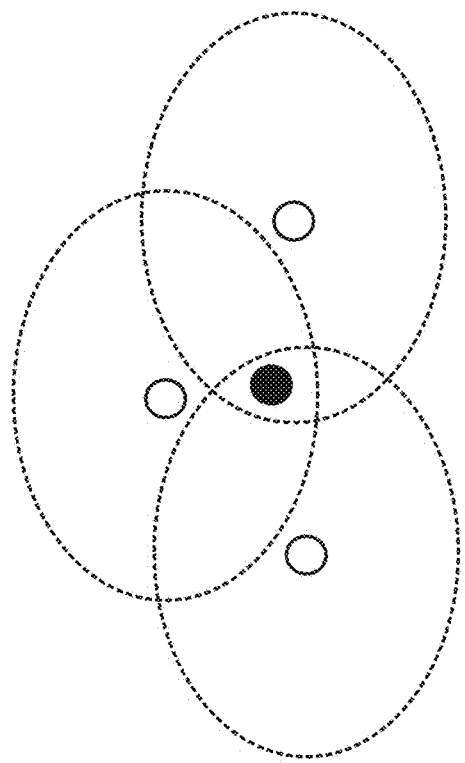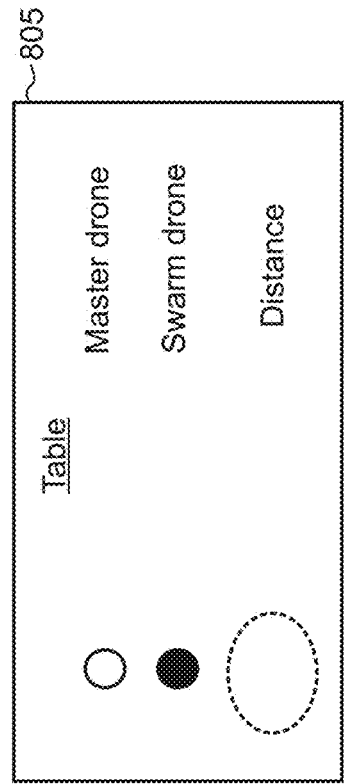
FIG 8
800

1700

1800

1900

PRECISION MAPPING USING AUTONOMOUS DEVICES

CROSS-REFERENCE TO RELATED APPLICATIONS

This application claims benefit and priority to U.S. Provisional Application Ser. No. 62/674,300 filed May 21, 2018, entitled "PRECISION MAPPING USING AUTONOMOUS DEVICES," the disclosure of which is incorporated herein by reference in its entirety.

BACKGROUND

Some physical environments, such as interiors of buildings or open exterior spaces, may have layouts which are unknown, outdated in map-form, or affected by harmful elements such as gasses, fire, and the like.

SUMMARY

Sets of mobile drones configured with fifth generation (5G) network connectivity capabilities may be deployed to create an ad-hoc 5G network to facilitate the precision mapping of a physical environment. Master drones are utilized in the ad-hoc 5G network to provide centralized data collection from swarm drones that are configured with various sensors to collect data in real time that describes the physical environment. The communications over the ad-hoc 5G network may be analyzed to further enable real time identification of the swarm drones in the environment with high precision compared with existing localization techniques. The sensor data and corresponding location data form data pairs which can be utilized to generate detailed and precise maps of the physical environment or be transmitted to remote services over a 5G backhaul for additional processing and analyses.

The master drones communicate with fixed 5G infrastructure including picocells, femtocells, and the like which provide backhaul access to a wide area network such as the internet. The master drones function as mobile 5G access points for the swarm drones and may be flexibly and rapidly deployed in the ad-hoc network topology. Exemplary 5G specific technologies for precise localization of the swarm drones include time of arrival (ToA) calculations, direction of arrival (DoA) calculations, and triangulation. The use of radio spectrum above 30 GHz, commonly termed "millimeter wave" (mmWave) in 5G parlance (among other 5G specific techniques) provides low latency, high bandwidth, and short line of sight (LoS), which enables precise localization of the swarm drones (e.g., ToA calculations are not miscued by high latency).

The collected data pairs of sensed environmental data and corresponding swarm drone location data may include various types and qualities. For example, the collected data may be associated with a fixed known location or may alternatively be calculated. The collected data may be associated with a fixed location if the collected data is local to the sensor that is coupled to the swarm drone (i.e., the sensor has short range sensitivity, so that collected data does not extend beyond the sensor itself). Alternatively, the collected data may be calculated using, for example, a depth sensor that is configured to sense a larger area within the environment. A camera, operating as a primary sensor can capture images of the environment and the depth sensor can be utilized as a complimentary secondary sensor to map corresponding specific locations for the captured images. In other illustrative embodiments, the depth sensor may be utilized as the primary sensor to collect environmental data while also providing the corresponding location information.

Multiple swarm drones can be deployed in ways to augment the benefits provided by 5G including precise localization, high bandwidth, and low latency. For example, the swarm drones may be configured using low cost sensors and other hardware to facilitate deployment in relatively large numbers. Multiple swarm drones may collectively traverse and scan the physical environment so that data pair collection can be performed with redundancy to increase a level of confidence in the data. In first responder scenarios involving a structure fire, for example, temperature data collected from multiple drones at a given stairway provide increased confidence that the stairway is safe before authorizing ingress for personnel, equipment, and other resources. The deployment of multiple swarm drones to particular areas of interest in the environment ensures that mission critical resources are not risked based on data from a single swarm drone.

The master drones may be configured to receive the collected data from the swarm drones and build the map of the physical environment. Alternatively, the master drones may transmit the received data over the 5G network or other networks to a remote server to build the map. The master drones may maneuver to maintain a functional range with the swarm drones or to improve location detection of the swarm drones. For example, as the swarm drones navigate and collect environmental data for the physical space, the master drones may determine that switching locations can improve triangulation to increase precision in location identification of the swarm drones.

A group of master drones may transmit data to a single master drone to enable consolidation when building the map. For example, while each swarm drone may transmit the real-time data to the nearest master drone, the master drones may transmit the collective data to a single master drone. Alternatively, each master drone can build maps using received data individually until the master drones are in range of each other and can exchange map information.

The master and swarm drones can each be configured for autonomous operations, be responsive to external control (e.g., from human operators), or operate semi-autonomously using a combination of independent and guided behaviors. For example, the swarm drones can operate autonomously upon the initial deployment in a building to thereby fan out and collect and transmit environmental data to the master drones. If a particular area of interest is identified, such as a hot spot in the structure fire scenario, then the master drones can direct additional swarm drones to the area to enable more comprehensive data to be collected. The master drones can operate autonomously, for example, to adjust their positions relative to fixed 5G infrastructure and to the swarm drones as needed to optimize connectivity, or to load balance the master drone resources across the physical environment as the scenario unfolds.

Advantageously, an ad-hoc 5G network may be deployed in areas which may be unknown or potentially hazardous to people. The 5G capabilities are specifically configured in the master and swarm drones to generate real-time data describing a physical environment which may otherwise be difficult to obtain if fixed network access points are unavailable. Using precise locations for each device within the communication chain—including 5G cell, master drone, and swarm drone—provides precision for the corresponding locations that are associated with the collected sensor data. This data can then be utilized in real time to accurately map and assess aspects of a physical environment by identifying hazards such as carbon monoxide, fire, smoke, or other harmful environments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 4 shows an illustrative diagram of precise location identification for a master drone and swarm drone when communicating over a 5G network;

FIG. 5 shows an illustrative diagram in which Time of Arrival is utilized with the 5G network;

FIGS. 8 and 9 show illustrative diagrams in which triangulation is utilized using the deployable ad-hoc 5G network implemented by the master drones;

Like reference numerals indicate like elements in the drawings. Elements are not drawn to scale unless otherwise indicated.

DETAILED DESCRIPTION

Figure 1:
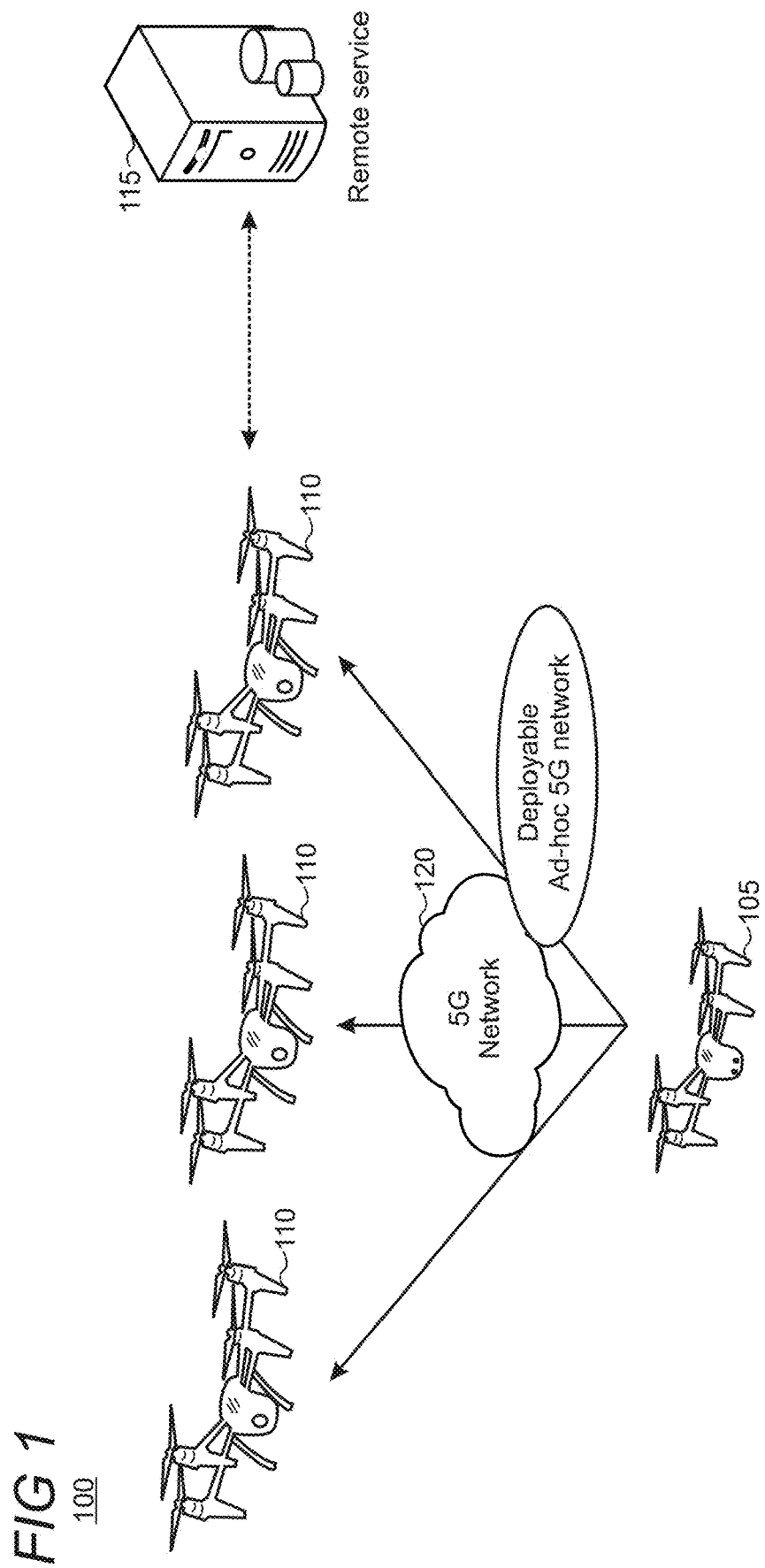
FIG. 1 shows an illustrative deployable ad-hoc fifth generation (5G) network with master drones and a swarm drone.

FIG. 1 shows an illustrative environment 100 in which a swarm drone 105 communicates with a master drone 110 over a fifth generation (5G) network 120. The swarm and master drones are each configured as navigable and autonomous computing devices and are additionally configured with 5G network capability. The swarm and master drones may alternatively be externally controlled by a user or be semi-autonomous in which the drones can navigate independently or by guided behaviors. Although discussion and embodiments herein may reference an airborne drone, other methods of motion for drones are also possible including ground travel or a hybrid of ground and air configurations. For example, the drones may be configured with propellers, wheels, or tank treads (also referred to as continuous tracks) for navigation or may alternatively be configured with versatility and have a hybrid of airborne and ground components for navigation. Any features and configurations discussed herein with respect to an airborne drone may likewise apply to a ground or hybrid configuration.

The master and swarm drones are configured with radio transceivers to wirelessly receive and transmit data to other devices that are within range. Although the drones may include near field communication technologies (e.g., Bluetooth™ and Wi-Fi), the drones are specifically configured with 5G capabilities in order to increase bandwidth, decrease latency, and ascertain precise locations for the drones. The master drones 110 may communicate over a 5G backhaul with a remote service 115 supported on a remote server to perform some of the processing performed by the master drones, as discussed in further detail below. By virtue of the navigability and 5G connectivity configurations of the master drones, a deployable ad-hoc 5G network is created when one or more of the master drones are deployed to a physical area, such as a building, park, home, and the like.

Figure 2:
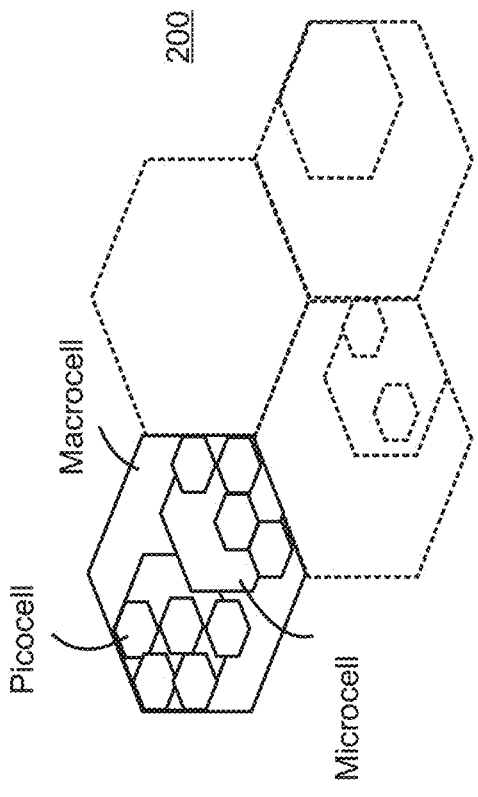
FIG. 2 shows an illustrative diagram of cells configured with 5G networking capabilities.

FIGS. 2-9 show illustrative diagrams and environments which facilitate the implementation of the 5G network 120 and precise location identification. For example, FIG. 2 shows an illustrative diagram 200 of cells which provide the 5G network connectivity for the drones. The designations for the various types of cells depicted in FIG. 2 are illustrative only and other types, configurations, and positioning of the cells are possible as well. The macrocell provides a wide range of connectivity and can include a cell tower which provides accessibility and exposure to large terrains. The microcell is configured to provide lesser connectivity range than the macrocell and may be, for example, a standard base station. The picocell provides a relatively lesser connectivity range than the microcell and may communicate with the microcell for data transmission. Although not shown, femtocells may be implemented which provide a lesser connectivity range than the picocell. The number, configuration, and positioning of the various cells depend on the necessary capacity for the particular coverage area.

Figure 3:
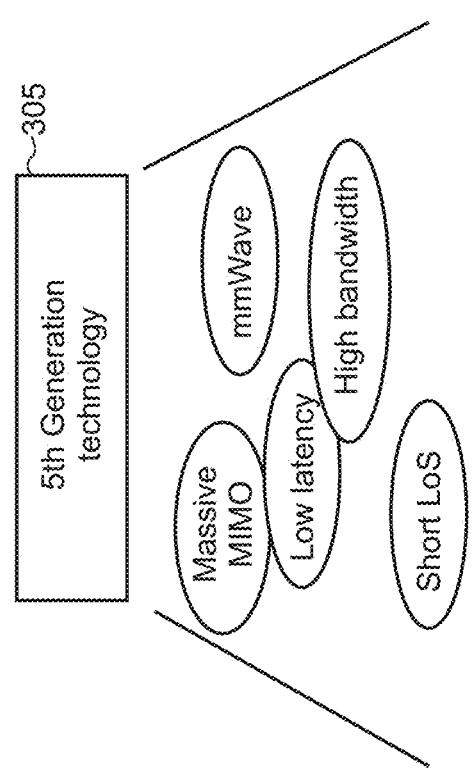
FIG. 3 shows an illustrative diagram of technologies which facilitate 5G connectivity and improvements over predecessor technologies.

The implementation of smaller cells such as microcells, picocells, and femtocells, provide the framework for which 5G can be implemented. FIG. 3 illustratively shows aspects of 5G technology 305 which provide various technical improvements over its predecessors (e.g., 4G, LTE, etc.) and thereby provide the basis to implement the present precision mapping using autonomous devices. For example, 5G utilizes millimeter wave (mmWave) which operates at a high frequency and is between 30 gigahertz (gHz) and 100 gHz on the electromagnetic spectrum, and is configured to use short wavelengths between ten millimeters (mm) and one mm. The mmWave provides greater transmission speeds, for which shorter distances between network access points (e.g., cells in FIG. 2) and devices are implemented.

5G technology also utilizes massive multiple-input multiple-output (massive MIMO) which utilizes numerous antennae across devices—access points and user devices—to increase the throughput and overall efficiency of data transmissions. These various improvements utilized by 5G networks, devices, and access points facilitate low latency, high bandwidth, and short line of sight (LoS) across devices, which collectively create an operational 5G network environment.

The features illustrated in FIG. 3 are non-exhaustive representations of those which make up 5G technology. For example, other characteristics that enable the benefits of 5G include 5G new radio (NR) operating on OFDMA (Orthogonal Frequency-Division Multiple Access) and beam steering, among others. As discussed in further detail below, the features, characteristics, and technological improvements offered by 5G technology and networking are utilized and leveraged by the swarm and master drones for real-time precise localization when collecting sensor data for a physical environment.

FIG. 4 shows an illustrative diagram of communications between the swarm drone 105, master drone 110, and picocells. In this embodiment, the master drone interacts with nearby picocells which are in range of the master drone, in which the picocells provide connectivity to a larger network such as a wide area network, the internet, and ultimately to other nodes on the network. The master drone may be considered a network access point since it is configured with 5G capabilities. Depending on the specific configuration of and implementation for the master drone, it may be considered a deployable and navigable microcell, picocell, femtocell, etc.

During deployment, the swarm drones may not be able to communicate directly with an external macro, micro, or picocell because of obstructions or power limitations. This is particularly true at mmWave frequencies where signal propagation may be limited. Therefore, a second class of drones, that is, the master drones, provide a communications bridge between the external cell network and the area occupied by the swarm drones. To fulfil this function, master drones may operate at higher power or on additional radio frequencies relative to the swarm drones.

The master drone's precise location 405 may be determined by its interaction with the picocells, and the precise location of the swarm drone can be determined by its interactions with the master drone. The known locations identified for a device in the chain enables the precise location identification for subsequent devices in the chain. Using the techniques discussed below, the master drone may determine the location for the swarm drone and transmit the determined location to the swarm drone for utilization while collecting data. Therefore, the swarm drone can associate an accurate location to environmental data as it is collected.

The detected location for the drones and collected data may be on a two- or three-dimensional scale. The three-dimensionality can provide greater detail in instances where a multi-story building or house are scanned and can also provide greater detail with respect to a single floor. The detected location of sensor data along x, y, and z axes can provide a fuller understanding of the environment. For example, if sensor data is collected on an object, such as a chair, then the three-dimensional model can indicate the heightened position of the sensor data.

The low latency, high bandwidth, and short LoS can be utilized to determine an accurate Time of Arrival (ToA) for data or signal transmissions between devices based on a known travel velocity. For example, a known time in which a respective device transmits and receives data can be utilized to determine the distance to the receiving device from the transmitting device. As shown in FIG. 5, such techniques can be utilized for the master drone and the swarm drone to determine accurate respective locations.

Figure 6:
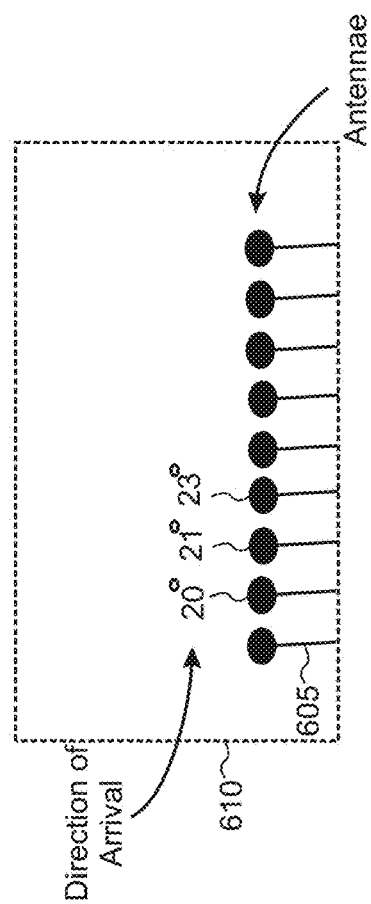
FIG. 6 shows an illustrative environment in which antennae of a master drone receive data from swarm drones.

FIG. 6 shows an illustrative environment in which swarm drones 105 transmit data to the master drone 110, in which the data transmissions are received at the master drone's antennae 605 at varying angles. The known degree in which data transmissions are received at the master drone can be utilized as an additional tool to identify a precise location of the swarm drone in the physical environment. Furthermore, because the master drone is configured with massive MIMO, the number of antennae is increased to provide greater detail as to the precise angular direction of the received signals.

Figure 7:
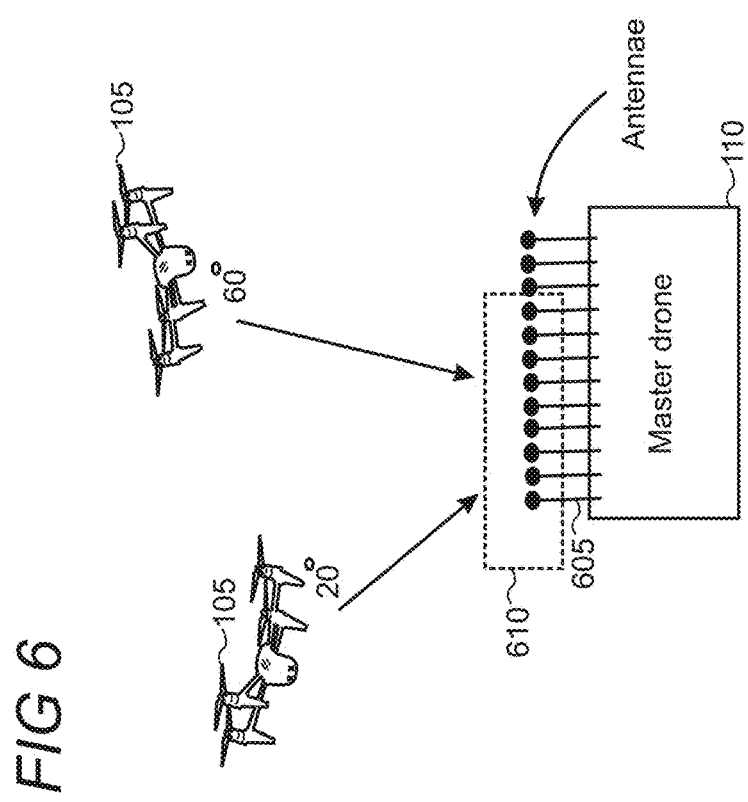
FIG. 7 shows an illustrative environment in which the antennae of the master drone identify a direction of arrival for received data from swarm drones.

FIG. 7 shows an illustrative cut-out 610 of the received signals at the antennae of FIG. 6, in which the direction of arrival (DoA) is determined at various antennae. The varying angles among the antennae can collectively be utilized to determine a precise direction from which the signals were received.

FIGS. 8 and 9 show illustrative environments 800 and 900, respectively, in which master drones can determine a location for swarm drones using, for example, ToA and DoA as discussed above. Table 805 shows the representations of the master drones, swarm drones, and the determined distance from the master drone. In one embodiment, when the master drones are deployed to create an ad-hoc 5G network, the master drones can utilize the 5G technologies to determine a precise location for swarm drones in the physical environment. FIGS. 8 and 9 respectively show examples in which three and four master drones are utilized to triangulate the swarm drone's precise location using the determined distance of the swarm drone from each respective master drone.

Figure 10:
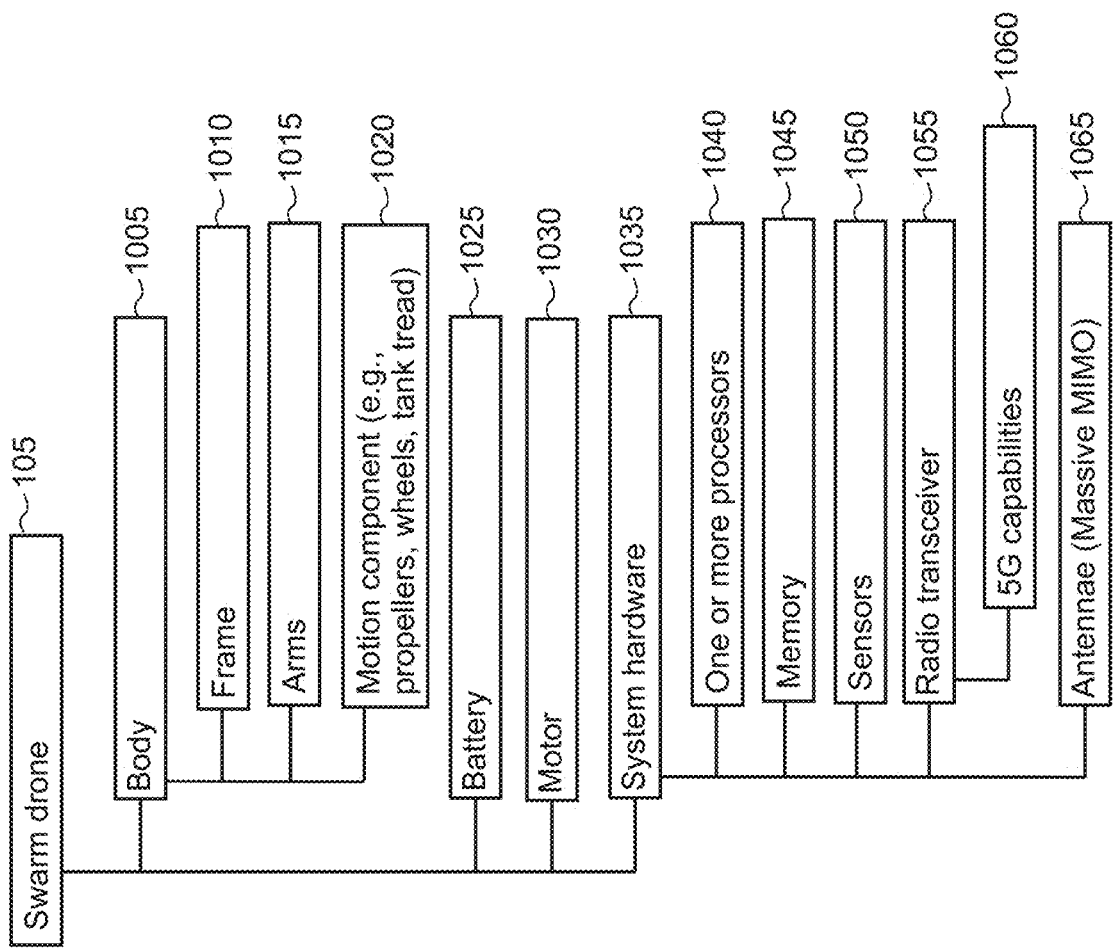
FIG. 10 shows illustrative hardware and configurations for a swarm drone.

FIG. 10 shows illustrative hardware and configurations of a swarm drone 105 in simplified form. The swarm drone can include a body 1005 which includes a frame 1010, arms 1015, and a motion component (e.g., propellers, wheels, tank treads, etc.) 1020 which, depending on the configuration, may be connected to the arms and used by the swarm drone to maneuver. Although discussion and embodiments herein may reference an airborne swarm drone, other methods of motion for swarm drones are also possible including ground travel or a hybrid of ground and air. Electrical components installed within the swarm drone include a battery 1025, motor 1030, and system hardware 1035 which includes one or more processors 1040, memory 1045, sensors 1050, radio transceiver 1055 with 5G capabilities 1060, and antennae with a massive MIMO configuration 1065.

Figure 11:
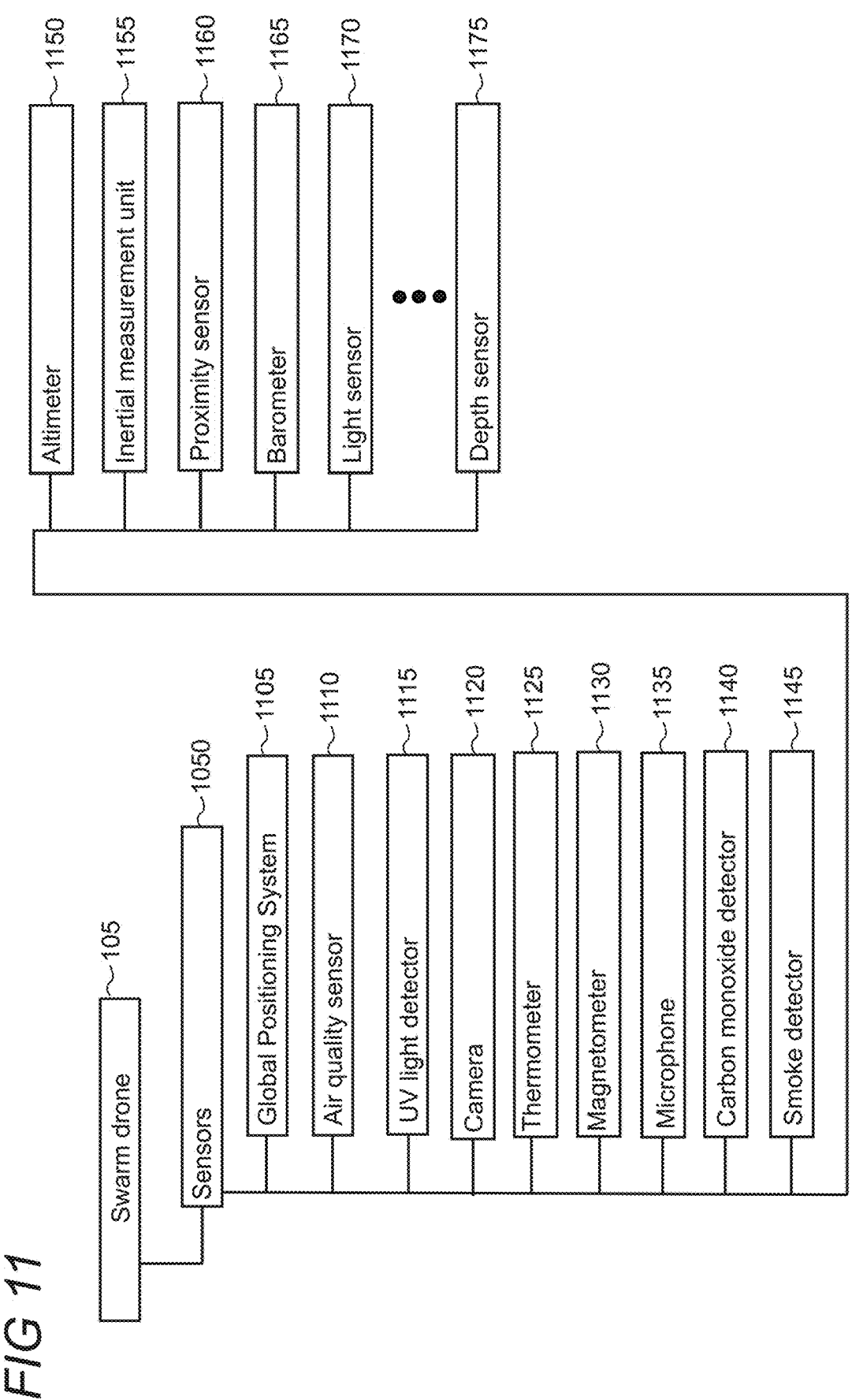
FIG. 11 shows an illustrative taxonomy of sensors which the swarm drone may utilize.

FIG. 11 shows illustrative sensors 1050 which can be installed in and utilized by the swarm drone 105. Exemplary sensors can include a global positioning system (GPS) 1105, air quality sensor 1110, Ultraviolet (UV) light detector 1115, camera 1120, thermometer 1125, magnetometer 1130, microphone 1135, carbon monoxide detector 1140, smoke detector 1145, altimeter 1150, inertial measurement unit 1155, proximity sensor 1160, barometer 1165, light sensor 1170, and depth sensor 1175. As illustrated by the ellipsis, the listed sensors are illustrative and non-exhaustive, and other sensors may also be utilized.

Figure 12:
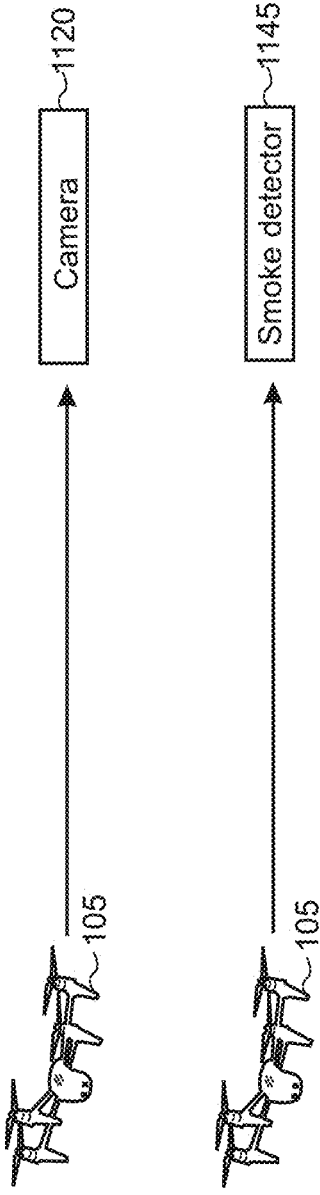
FIG. 12 shows illustrative sensors utilized by respective swarm drones.

FIG. 12 shows an illustrative embodiment in which the respective swarm drones 105 are configured with specific sensors for deployment. For example, in both embodiments the respective swarm drones are configured with a camera and smoke detector. Thus, when the swarm drones are deployed in a physical environment, the respective drones can either detect smoke or capture photos or video while the drone navigates the area.

Figure 13:
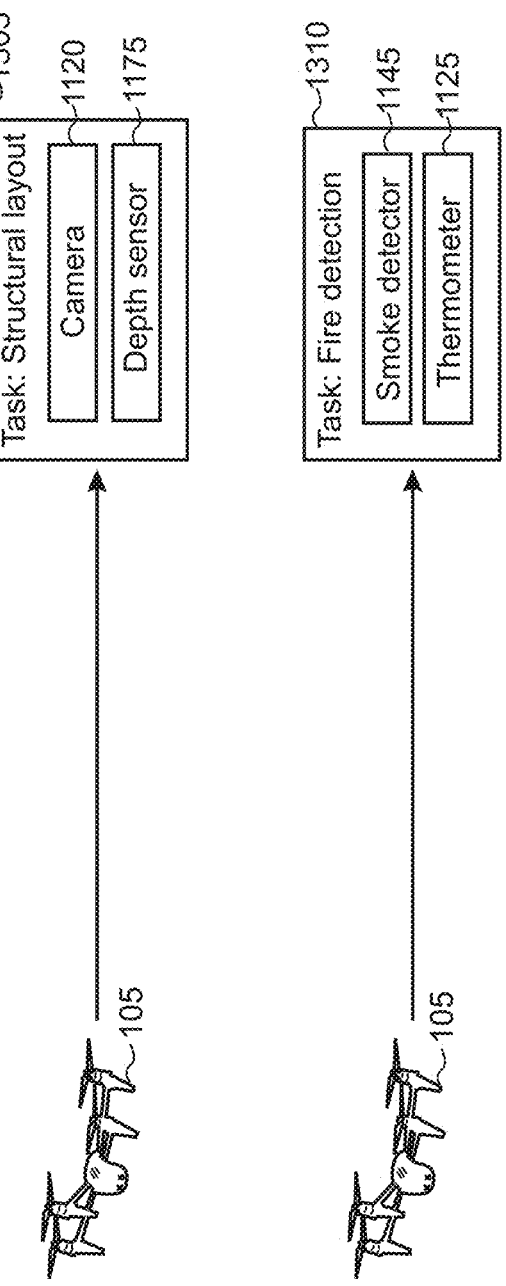
FIG. 13 shows illustrative sensors utilized to execute particular tasks assigned to given swarm drones.

FIG. 13 shows an illustrative diagram in which the respective swarm drones 105 are assigned specific tasks, in which the sensors employed enable execution of the tasks. For example, in embodiment 1305 the task is to generate a structural layout of a physical environment, in which exemplary sensors which can enable execution of this task include the camera 1120 and depth sensor 1175. In embodiment 1310, the task is to identify hazardous areas which may be inflicted with fire, in which exemplary sensors which can enable execution of this task include the smoke detector 1145 and thermometer 1125. The implementation of sensors allows the swarm drones to create a map of a physical environment with precise locations associated with each piece of collected sensor data. Alternatively, the created map may overlay an existing map of the physical environment, in which the created map can update aspects of the existing map including structures and environmental information picked up by the sensors (e.g., locations of carbon monoxide).

Figure 14A:
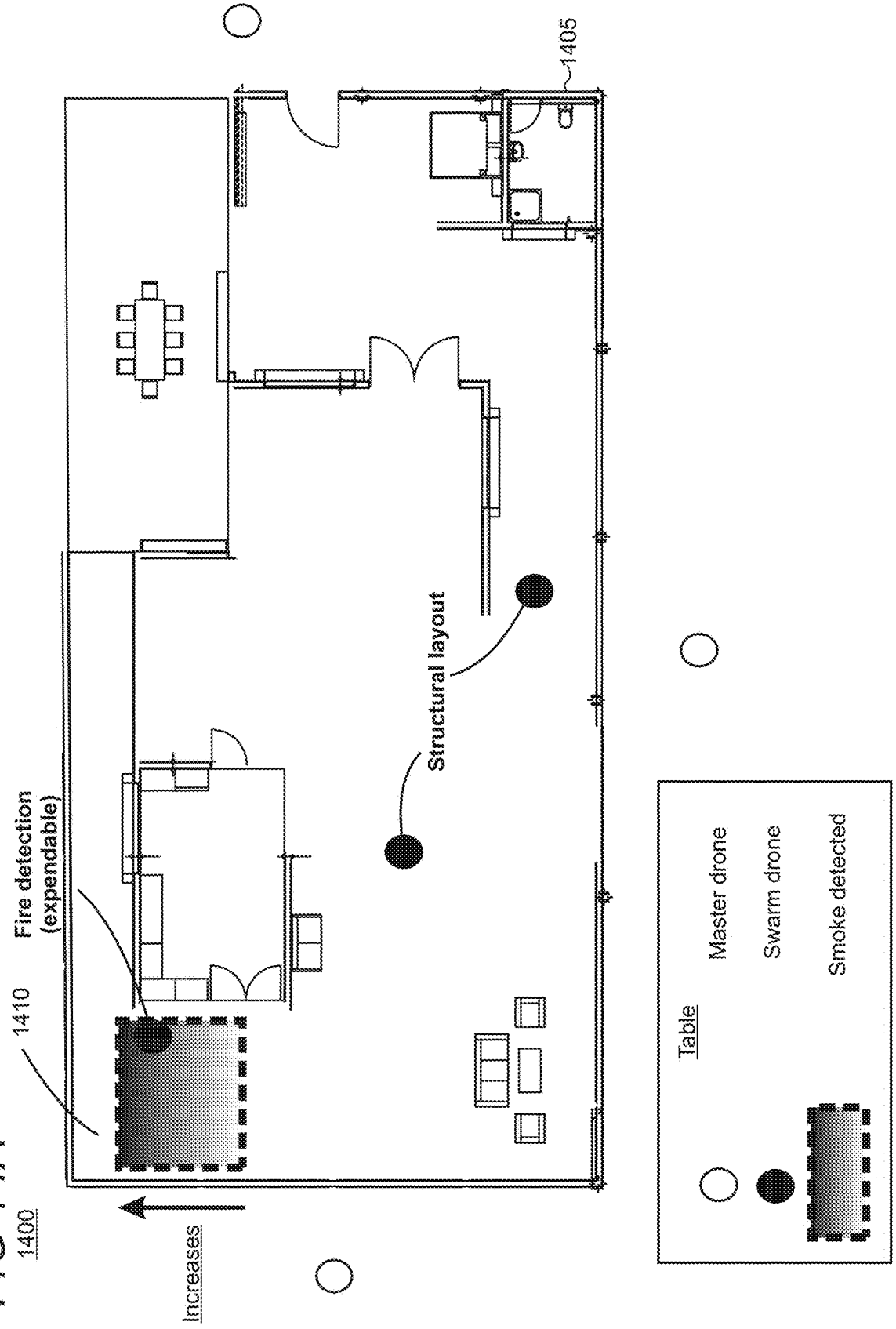
FIGS. 14A-B show illustrative environments of a deployable ad-hoc 5G network utilized to generate a map based on sensor data collected by swarm drones.

FIGS. 14A and B show respective illustrative environments 1400 and 1450 in which an ad-hoc deployable 5G network is created using the flexibly and rapidly deployed master drones, which are spread about the periphery of the building 1405. The master drones provide the benefit of 5G network capabilities to thereby develop a detailed map of the building's environment, negative space, and characteristics. For example, the master and swarm drones can leverage the ad-hoc 5G capabilities and techniques for real-time precise localization of the swarm drones relative to the master drones (FIGS. 2-9). In turn, sensory data collected by the swarm drones can be assigned precise locations within the physical environment in which the swarm drones are deployed.

Figure 15:
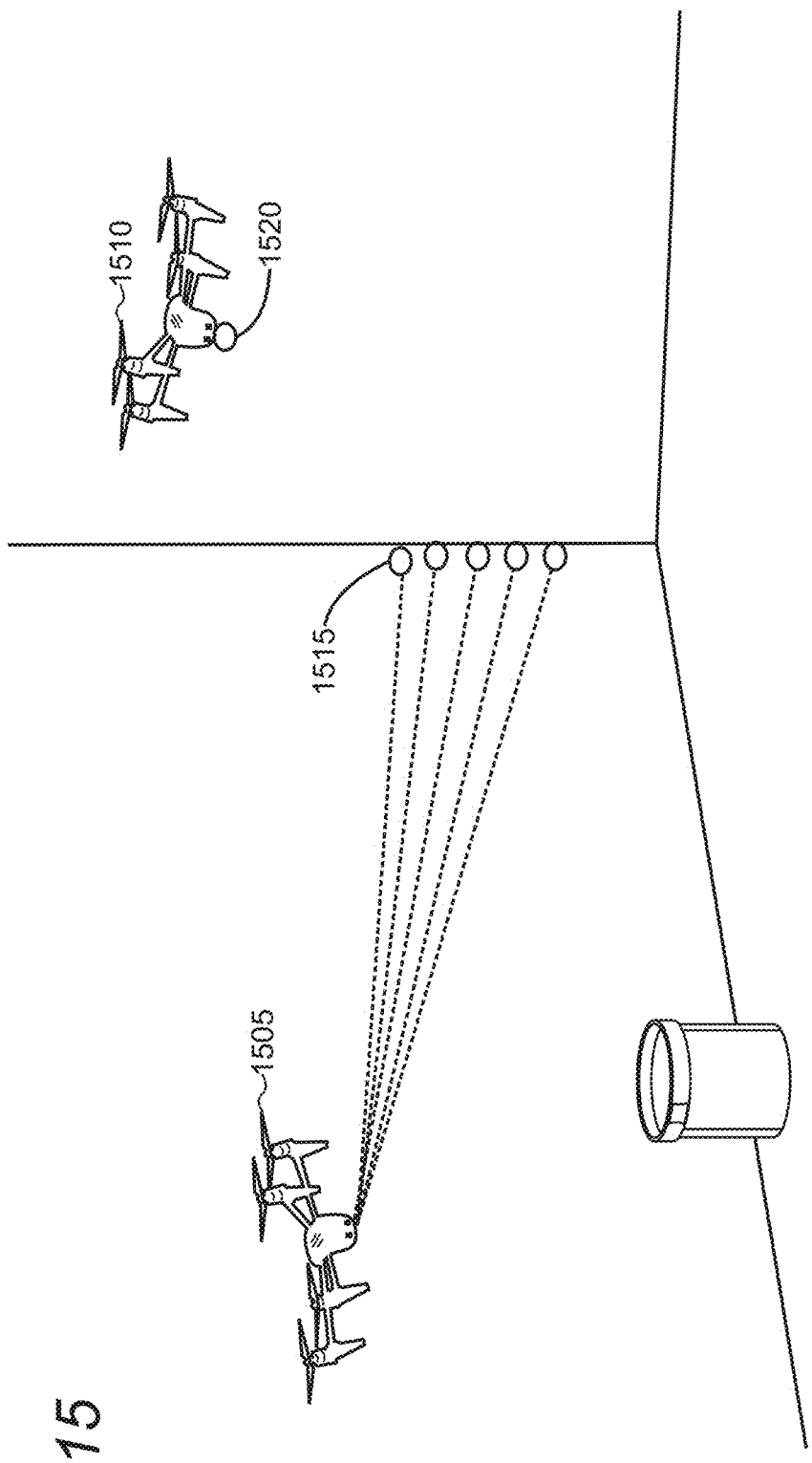
FIG. 15 shows an illustrative environment in which remote and local point locations are determined.

FIG. 15 shows two different scenarios in which locations for points are determined for placement in a generated map, which include remote point locations 1515 and local point locations 1520. Swarm drone 1505 is configured with sensors which scan the physical environment, such as the structural layout of the environment, in which the scanned points are locations remote from the swarm drone. Accordingly, the specific location of these points is to be determined so that an accurate map is generated of the environment. The swarm drone may be configured with sensory and positioning equipment to determine the position of the collected points and data within the physical environment.

In one embodiment, a depth sensor can be utilized as a complimentary sensor device to operate in conjunction with a primary sensor in order to identify the precise location for data collected by the primary sensor. For example, the depth sensor can be aligned with and directed to the same location as a camera in order to pick up the precise location from which the data was collected by the camera. Other sensory devices which collect remote data can also use a depth sensor and the like to determine precise locations for each piece of collected data.

The data collected by the depth sensor can be used to generate a point cloud structure, in which the data collected by the primary sensor is associated with each point in the point cloud structure. FIG. 15 shows an example of a swarm drone collecting remote point locations 1515 for each instance of collected data in the physical environment.

Depending on the specific deployment and configuration, the distance between remote point locations can vary. For example, if time is of the essence, then greater distances between points can be used to expedite the scan of the physical environment. In another embodiment, if no relevant data is detected (e.g., no smoke), then greater distance can exist between points during the scan, whereas when relevant elements are detected, then the swarm drone can reduce the distance between scans to collect a sufficient number of accurate and precise points of data. Accordingly, the distance between points may be contingent on and automatically adjust according to a sliding scale based on detected sensor levels.

FIG. 15 shows an illustrative embodiment in which local point locations 1520 are determined for local sensors on the swarm drone 1510. For example, certain sensors may operate and collect data without extending beyond the sensor itself (e.g., a thermometer); therefore, techniques to identify the precise location within the physical environment are implemented. Since the precise location of the swarm drone is known, the positioning of the sensor can be static and known to the swarm drone and/or the master drone. For example, the swarm drone's sensor may be a fixed location twenty degrees south and two inches from the center of the swarm drone's body. Accordingly, local points collected by local sensors are assigned locations based on the identified location of the swarm drone and adjusted according to the fixed location of the sensor relative to the identified precise location for the swarm drone (e.g., the center of the swarm drone's body).

Figure 22:
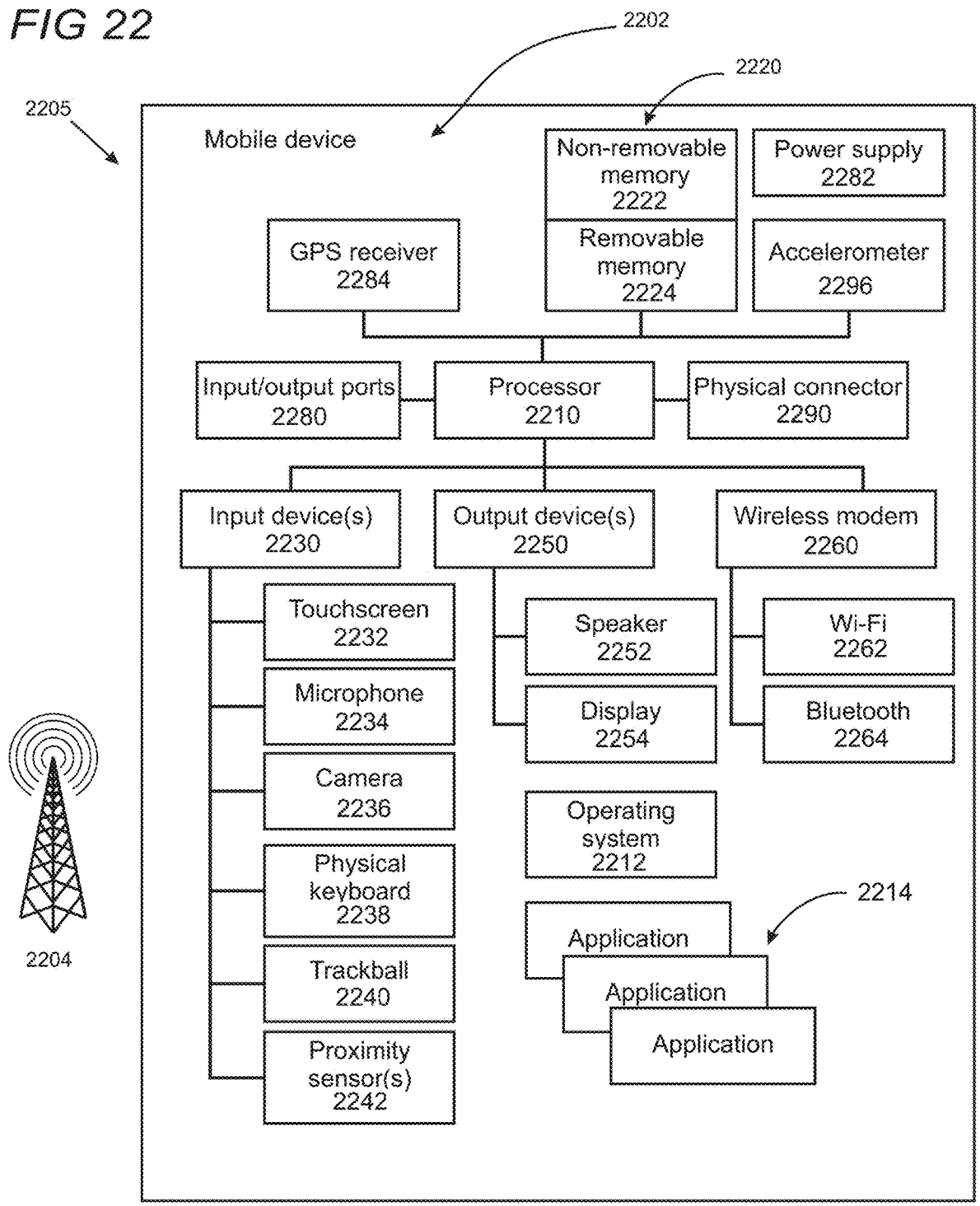
FIG. 22 is a block diagram of an illustrative device such as a mobile phone or smartphone.

Returning to FIGS. 14A and B, the swarm drones may be configured to operate autonomously such that the swarm drones traverse the environment without manual operation. Thus, cameras, depth sensors (e.g., LIDAR), proximity sensors, and other autonomous technologies are utilized by the swarm drone to ascertain its location in the physical environment. Autonomous movement by the swarm drone may be useful when the layout of the physical environment is unknown and elements hazardous for humans are present, such as fire. In another embodiment, the swarm drones may be configured for external and manual control by a user in which the swarm drones are paired with a remote control or mobile computing device controllable by a user (FIG. 22). The swarm drones may be configured with a combination of independent and human-guided behaviors.

FIG. 14A illustratively shows two swarm drones which are deployed to collect data pertaining to the structural layout of the building's physical environment. These drones may be configured with depth sensors, cameras, and the like to capture an accurate map of the environment, including walls, floors, ceilings, and interior objects such as furniture, toys, animals, people, etc.

FIG. 14A also representatively shows a third swarm drone assigned the task of fire detection. This swarm drone may be configured with a smoke detector, thermometer, and the like to detect indications of a fire or other harmful elements. The combination of precise localization for the swarm drones and the collected sensory data provides a detailed map of all aspects for the physical environment. For example, in the illustrative area 1410 in the building 1405, the swarm drone can identify the gradual increase of smoke while traversing the area, which is graphically depicted as transitioning from white (no or low levels detected) to gray to black (high levels detected). This information is included in the created map so that users can know specifically where harmful elements exist.

The fire detection swarm drone may be expendable as shown in FIG. 14A. For scenarios in which the swarm drone is traversing dangerous areas or hazardous elements, such as for fire detection, the swarm drone may be configured to travel as far as possible into the hazardous elements until the swarm drone becomes overheated, engulfed in flames, or destroyed. Thus, while some swarm drones may be configured to navigate (e.g., turn left or right) or retreat when unsafe conditions, such as fire, are detected, some swarm drones may be configured to follow the path toward the unsafe conditions. The fire detection swarm drones can continue to travel toward the dangerous elements while collecting and transmitting the real-time data for generation of the map. This information can then be harnessed by fire professionals to focus their efforts.

After the swarm drones have completed their initial scan of the environment, the fire professionals and fire responders who enter the scene can use the ad-hoc 5G network. For example, the fire professionals can traverse the environment with personal computing devices which connect to the 5G ad-hoc network. This can enable location detection of the first responders relative to the generated map and allow the users to see their location. If the swarm drones are still scanning the environment (e.g., remaining unscanned areas or an updated subsequent scan being performed), the first responders can continue to receive updated map information in real time.

Figure 14B:
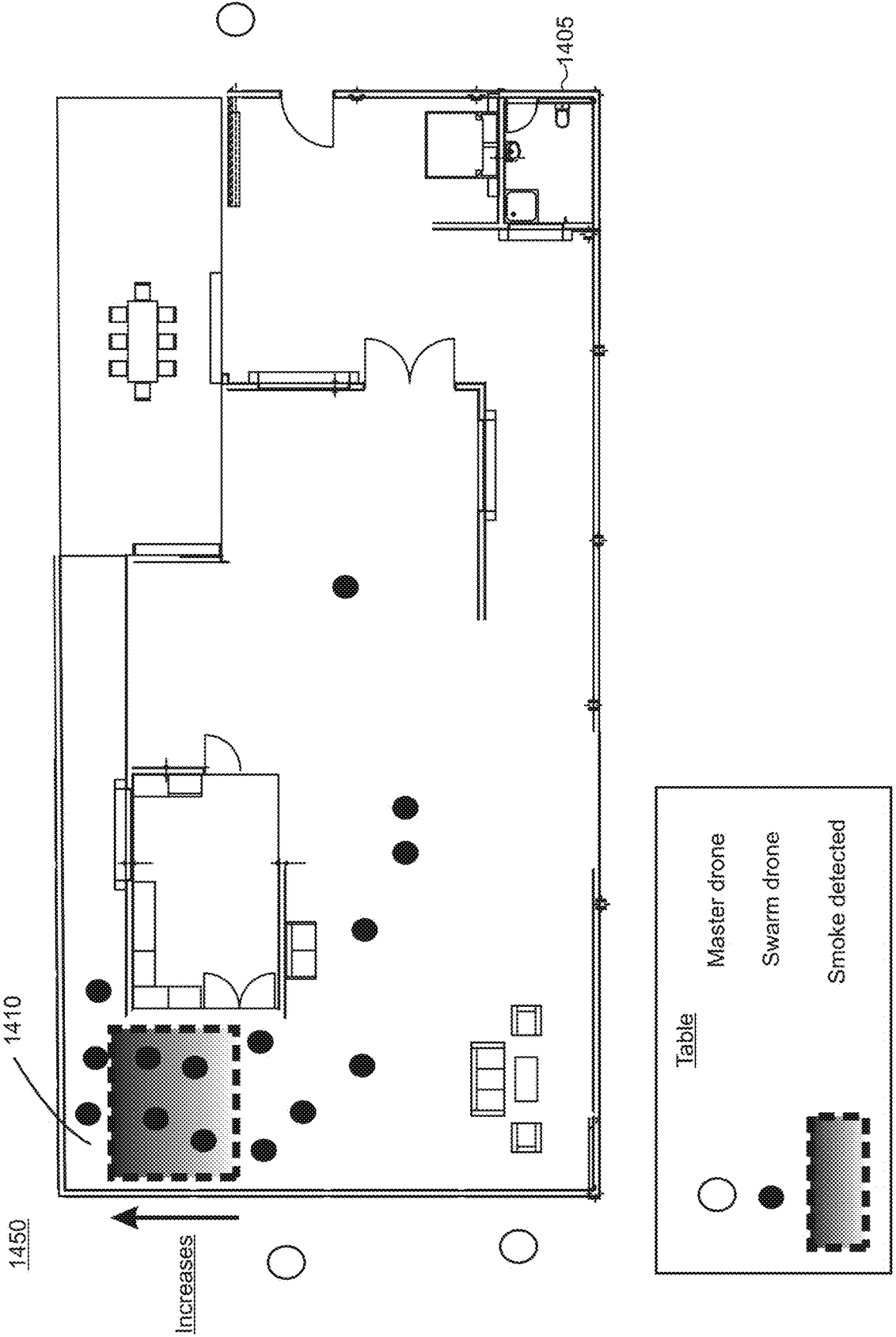

FIG. 14B illustratively shows a scenario in which dozens of swarm drones may be deployed to navigate and scan the building which thereby causes redundancy in localization and gathered sensor data to increase the confidence value for each point. The deployment of numerous swarm drones facilitates the real-time capture and mapping of the physical environment for use by professionals.

Data pairs are developed using the collected sensor data and corresponding location data for the swarm drones which can be utilized to generate detailed and precise maps of the physical environment with high confidence that a scanned location is within centimeters of its real-world location. When large numbers of swarm drones are deployed to scan a defined area, as in FIG. 14B, overlap and repeated scans of points by the multiple drones increase the confidence value associated with respective points. Localization redundancy and scan redundancy by the swarm drones and increased confidence for points facilitate the precise mapping and increased reliability of locations for the points in the physical environment.

FIG. 14B shows a scenario in which the swarm drones may be configured for traveling to relevant areas in which a relevant element has been identified (i.e., an element which the swarm drones are configured to detect). In this situation the additional swarm drones may each be configured to detect smoke or other fire-related elements which can be used by the master drones in building the map. The master drones can direct one or more swarm drones to a relevant area, such as area 1410, when another swarm drone identifies an element, such as high temperatures. Alternatively, the swarm drones can communicate with each other when the sensor for a swarm drone picks up an element, which thereby causes remote swarm drones to navigate to that area as well. The remote swarm drones may temporarily scan the area and then return to their previous locations to finish scanning the entire defined area. This configuration of the swarm drones can expedite the process of scanning the physical environment, which can be beneficial in dangerous situations for which it is desirable for professionals to swiftly address. As discussed in further detail below with respect to FIG. 16, the master drones shown in FIG. 14B shifted positions to increase functionality and reception with the swarm drones at the relevant area 1410.

In an illustrative embodiment, swarm drones can be deployed to the building to identify ingress and egress routes. Localization redundancy and scan redundancy among multiple swarm drones that indicates an entranceway or staircase is free from smoke and heat provides increased confidence that humans can ingress and egress those areas.

Confidence values associated with the sensor data can be based on the data collected at respective master drones as well. For example, if multiple master drones have localization and sensor information for distinct swarm drones, then the collective similarities among the data collected across the master drones also provide increased confidence in the data. Thus, confidence in collected data can be based on the redundancy of data collected by swarm drones, and additionally or alternatively based on similarities of data collected across master drones.

Figure 16:
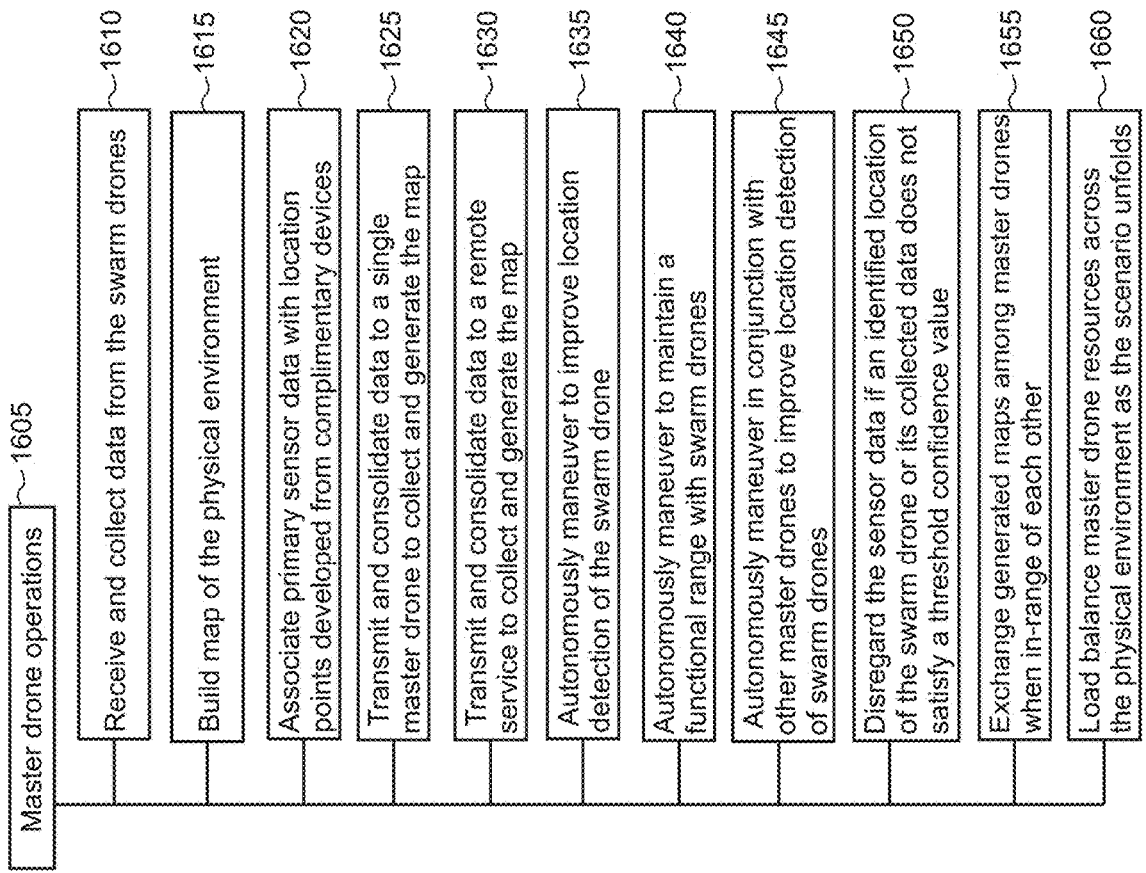
FIG. 16 shows a taxonomy of operations performable by master drones.

The sensor data collected by the swarm drones are transmitted to the master drones using the 5G radio transmitters. FIG. 16 illustratively shows a taxonomy of operations performable by the master drones 1605. Operations include receive and collect data from the swarm drones 1610, build map of the physical environment 1615, associate primary sensor data (e.g., structural layout) with location points (e.g., point cloud structure) developed from complimentary sensor devices (e.g., depth sensor) 1620, transmit and consolidate data to a single master drone to collect and generate the map 1625, transmit and consolidate data to a remote service to collect and generate the map 1630, autonomously maneuver to improve location detection of the swarm drones 1635, autonomously maneuver to maintain a functional range with swarm drones 1640, autonomously maneuver in conjunction with other master drones to improve location detection of swarm drones (e.g., triangulation) 1645, disregard the sensor data if an identified location of the swarm drone or its collected data does not satisfy a threshold confidence value 1650, exchange generated maps among master drones when in-range of each other 1655, and load balance the master drone resources across the physical environment as the scenario unfolds 1660.

Figure 17:
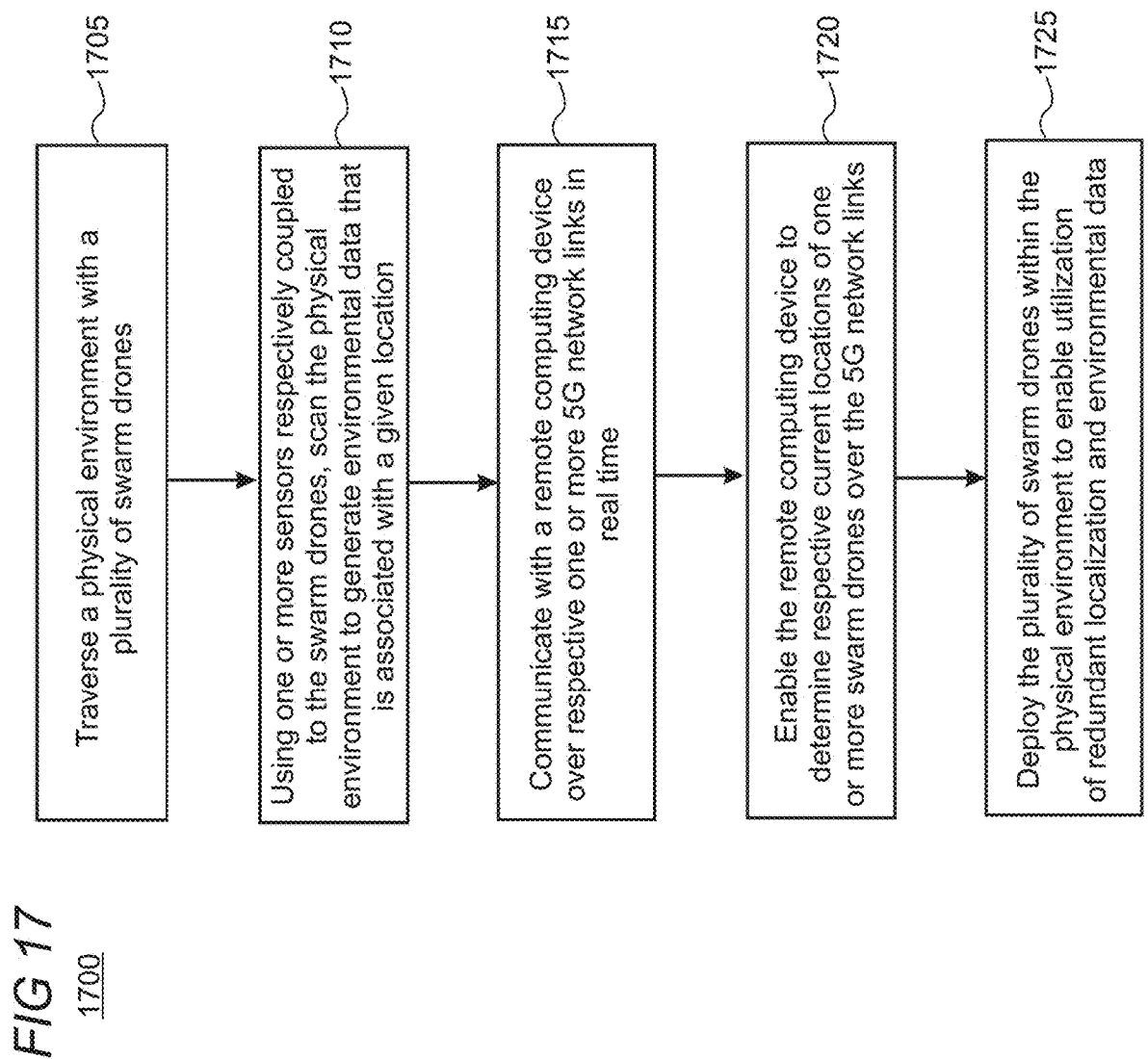
FIGS. 17-19 show illustrative processes performed by one or more of the swarm drone, master drone, or remote server.

FIG. 17 is a flowchart of an illustrative method 1700 in which a swarm drone collects environmental data. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1705, a plurality of swarm drones traverse a physical environment. In step 1710, using one or more sensors respectively coupled to the swarm drones, scan the physical environment to generate environmental data that is associated with a given location in the physical environment. In step 1715, the swarm drones communicate with a remote computing device over respective one or more 5G network links in real time. In step 1720, the swarm drones enable the remote computing device to determine respective current locations of one or more swarm drones over the 5G network links. In step 1725, the plurality of swarm drones are deployed within the physical environment to enable utilization of redundant localization and environmental data.

Figure 18:
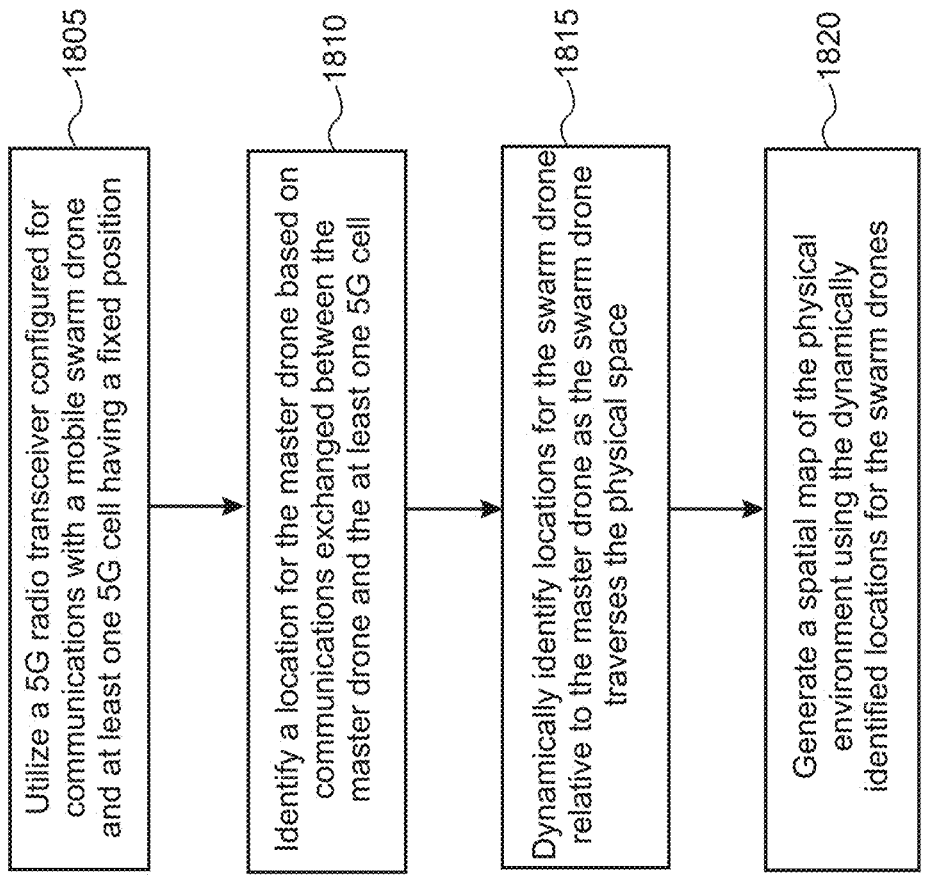

FIG. 18 is a flowchart of an illustrative method 1800 in which, in step 1805, a mobile master drone utilizes a 5G radio transceiver configured for communications with a mobile swarm drone and at least one 5G cell having a fixed position. In step 1810, a location is identified for the master drone based on communications exchanged between the master drone and the at least one 5G cell. In step 1815, locations for a swarm drone are dynamically identified relative to the master drones as the swarm drone traverses a physical space. In step 1820, a spatial map of the physical environment is generated using the dynamically identified locations for the swarm drones.

Figure 19:
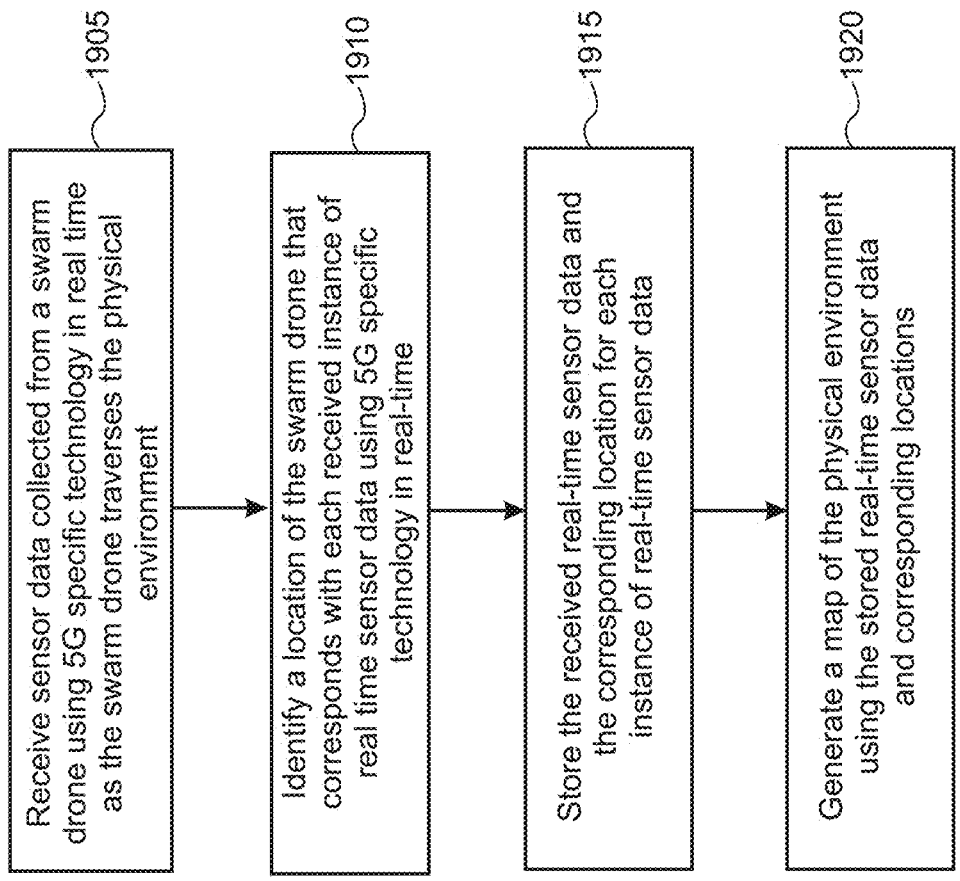

FIG. 19 is a flowchart of an illustrative method 1900 in which a computing device receives real-time sensor data and generates a map using the received sensor data. In step 1905, sensor data is received which is collected from a swarm drone using 5G specific technology in real time as the swarm drone traverses the physical environment. In step 1910, a location of the swarm drone is identified that corresponds with each received instance of real-time sensor data using 5G specific technology in real time. In step 1915, the received real-time sensor data and the corresponding location for each instance of real-time sensor data is stored. In step 1920, a map of the physical environment is generated using the stored real-time sensor data and corresponding locations.

Figure 20:
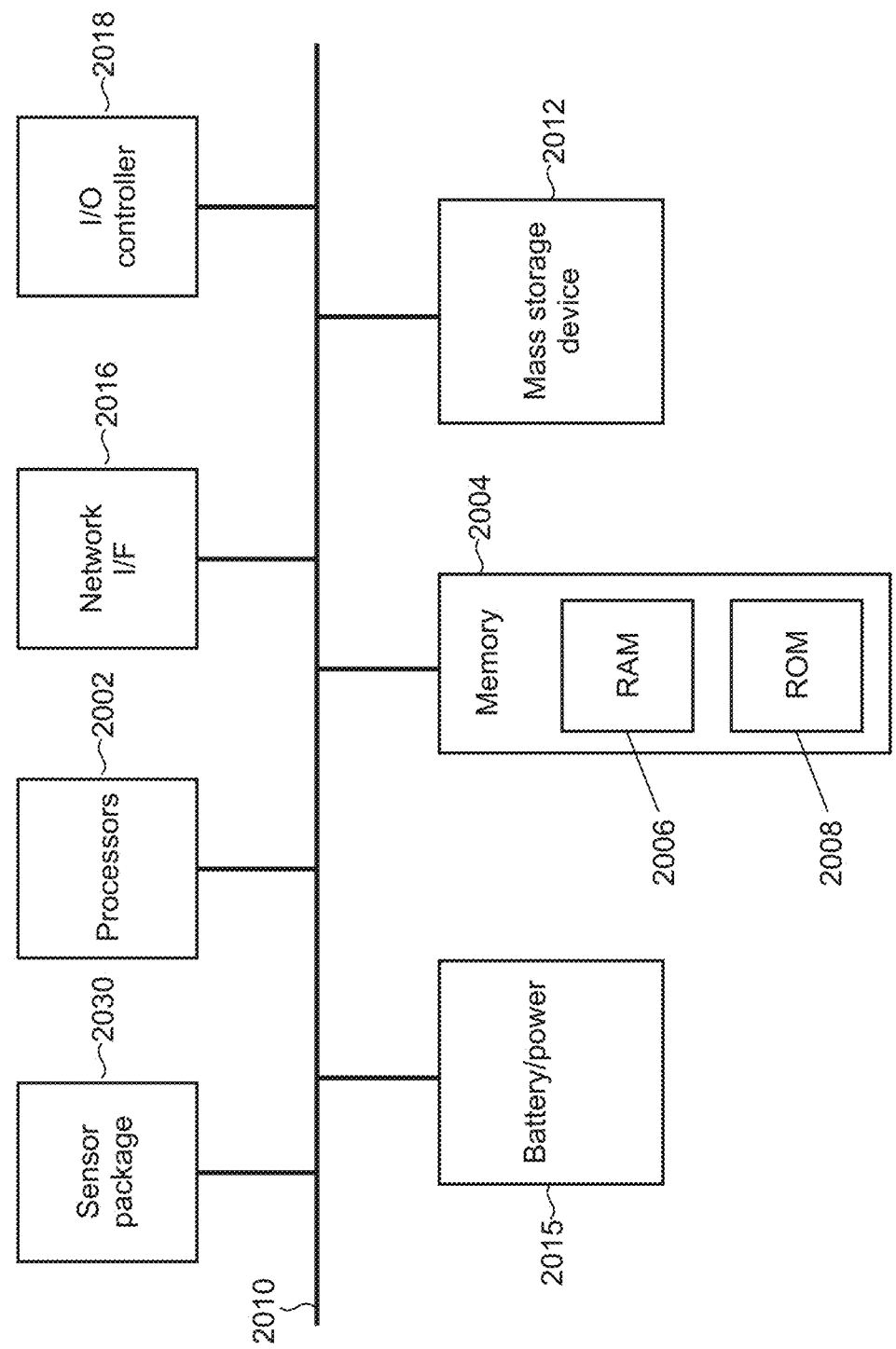
FIG. 20 is a simplified block diagram of an illustrative drone that may be used in part to implement the present precision mapping using autonomous devices.

FIG. 20 shows an illustrative architecture 2000 for a device capable of executing the various components described herein for providing precision mapping for autonomous devices. Thus, the architecture 2000 illustrated in FIG. 20 shows a system architecture that may be adapted for a swarm drone.

The architecture 2000 illustrated in FIG. 20 includes one or more processors 2002 (e.g., central processing unit, graphic processing units, etc.), a system memory 2004, including RAM (random access memory) 2006 and ROM (read only memory) 2008, and a system bus 2010 that operatively and functionally couples the components in the architecture 2000. A basic input/output system containing the basic routines that help to transfer information between elements within the architecture 2000, such as during startup, is typically stored in the ROM 2008. The architecture 2000 further includes a mass storage device 2012 for storing software code or other computer-executed code that is utilized to implement applications, the file system, and the operating system. The mass storage device 2012 is connected to the processor 2002 through a mass storage controller (not shown) connected to the bus 2010. The mass storage device 2012 and its associated computer-readable storage media provide non-volatile storage for the architecture 2000. Although the description of computer-readable storage media contained herein refers to a mass storage device, such as a hard disk or CD-ROM drive, it may be appreciated by those skilled in the art that computer-readable storage media can be any available storage media that can be accessed by the architecture 2000.

The architecture 2000 further supports a sensor package 2030 comprising one or more sensors or components that are configured to detect parameters that are descriptive of the environment. For example, the sensors may be positioned directly or indirectly on the swarm drone's body. The sensors may be configured to run continuously, or periodically. The architecture further supports power and/or battery components (collectively identified by reference numeral 2015). For example, in autonomous drone applications, one or more batteries or power packs may be rechargeable or replaceable to facilitate portability, mobility, and re-use.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2000.

According to various embodiments, the architecture 2000 may operate in a networked environment using logical connections to remote computers through a network. The architecture 2000 may connect to the network through a network interface unit 2016 connected to the bus 2010. It may be appreciated that the network interface unit 2016 also may be utilized to connect to other types of networks and remote computer systems. The architecture 2000 also may include an input/output controller 2018 for receiving and processing input from a number of other devices, including a keyboard, mouse, touchpad, touchscreen, control devices such as buttons and switches or electronic stylus (not shown in FIG. 20). Similarly, the input/output controller 2018 may provide output to a display screen, user interface, a printer, or other type of output device (also not shown in FIG. 20).

The architecture 2000 may include a voice recognition unit (not shown) to facilitate user interaction with a device supporting the architecture through voice commands, a natural language interface, or through voice interactions with a personal digital assistant (such as the Cortana® personal digital assistant provided by Microsoft Corporation). The architecture 2000 may include a gesture recognition unit (not shown) to facilitate user interaction with a device supporting the architecture through sensed gestures, movements, and/or other sensed inputs.

It may be appreciated that the software components described herein may, when loaded into the processor 2002 and executed, transform the processor 2002 and the overall architecture 2000 from a general-purpose computing system into a special-purpose computing system customized to facilitate the functionality presented herein. The processor 2002 may be constructed from any number of transistors or other discrete circuit elements, which may individually or collectively assume any number of states. More specifically, the processor 2002 may operate as a finite-state machine, in response to executable instructions contained within the software modules disclosed herein. These computer-executable instructions may transform the processor 2002 by specifying how the processor 2002 transitions between states, thereby transforming the transistors or other discrete hardware elements constituting the processor 2002.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2000 in order to store and execute the software components presented herein. It also may be appreciated that the architecture 2000 may include other types of computing devices, including wearable devices, handheld computers, embedded computer systems, smartphones, PDAs, and other types of computing devices known to those skilled in the art. It is also contemplated that the architecture 2000 may not include all of the components shown in FIG. 20, may include other components that are not explicitly shown in FIG. 20, or may utilize an architecture completely different from that shown in FIG. 20.

Figure 21:
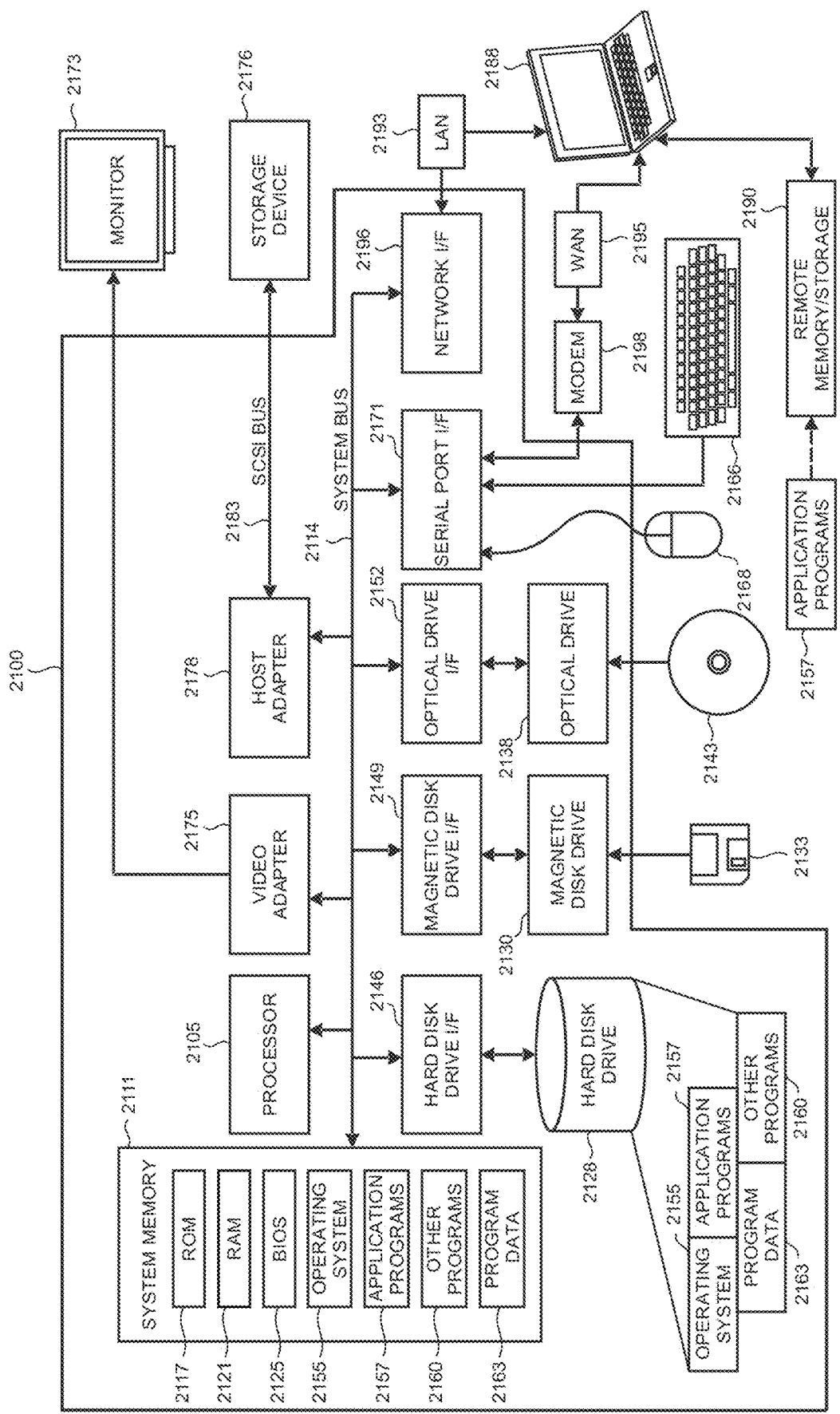
FIG. 21 is a simplified block diagram of an illustrative computer system that may be used in part to implement the precision mapping using autonomous devices.

FIG. 21 is a simplified block diagram of an illustrative computer system 2100 such as a server which may be used to implement the present precision mapping using autonomous devices. Additionally, the master drone may be configured as such in order to process the sensor data and build the map of the physical environment. Computer system 2100 includes a processor 2105, a system memory 2111, and a system bus 2114 that couples various system components including the system memory 2111 to the processor 2105. The system bus 2114 may be any of several types of bus structures including a memory bus or memory controller, a peripheral bus, or a local bus using any of a variety of bus architectures. The system memory 2111 includes read only memory (ROM) 2117 and random access memory (RAM) 2121. A basic input/output system (BIOS) 2125, containing the basic routines that help to transfer information between elements within the computer system 2100, such as during startup, is stored in ROM 2117. The computer system 2100 may further include a hard disk drive 2128 for reading from and writing to an internally disposed hard disk (not shown), a magnetic disk drive 2130 for reading from or writing to a removable magnetic disk 2133 (e.g., a floppy disk), and an optical disk drive 2138 for reading from or writing to a removable optical disk 2143 such as a CD (compact disc), DVD (digital versatile disc), or other optical media. The hard disk drive 2128, magnetic disk drive 2130, and optical disk drive 2138 are connected to the system bus 2114 by a hard disk drive interface 2146, a magnetic disk drive interface 2149, and an optical drive interface 2152, respectively. The drives and their associated computer-readable storage media provide non-volatile storage of computer-readable instructions, data structures, program modules, and other data for the computer system 2100. Although this illustrative example includes a hard disk, a removable magnetic disk 2133, and a removable optical disk 2143, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present precision mapping using autonomous devices. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are non-transitory and do not include waves, signals, and/or other transitory and/or intangible communication media.

A number of program modules may be stored on the hard disk, magnetic disk, optical disk, ROM 2117, or RAM 2121, including an operating system 2155, one or more application programs 2157, other program modules 2160, and program data 2163. A user may enter commands and information into the computer system 2100 through input devices such as a keyboard 2166 and pointing device 2168 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2105 through a serial port interface 2171 that is coupled to the system bus 2114, but may be connected by other interfaces, such as a parallel port, game port, or universal serial bus (USB). A monitor 2173 or other type of display device is also connected to the system bus 2114 via an interface, such as a video adapter 2175. In addition to the monitor 2173, wearable devices and personal computers can typically include other peripheral output devices (not shown), such as speakers and printers. The illustrative example shown in FIG. 21 also includes a host adapter 2178, a Small Computer System Interface (SCSI) bus 2183, and an external storage device 2176 connected to the SCSI bus 2183.

The computer system 2100 is operable in a networked environment using logical connections to one or more remote computers, such as a remote computer 2188. The remote computer 2188 may be selected as a personal computer, a server, a router, a network PC, a peer device, or other common network node, and typically includes many or all of the elements described above relative to the computer system 2100, although only a single representative remote memory/storage device 2190 is shown in FIG. 21. The logical connections depicted in FIG. 21 include a local area network (LAN) 2193 and a wide area network (WAN) 2195. Such networking environments are often deployed, for example, in offices, enterprise-wide computer networks, intranets, and the Internet.

When used in a LAN networking environment, the computer system 2100 is connected to the local area network 2193 through a network interface or adapter 2196. When used in a WAN networking environment, the computer system 2100 typically includes a broadband modem 2198, network gateway, or other means for establishing communications over the wide area network 2195, such as the Internet. The broadband modem 2198, which may be internal or external, is connected to the system bus 2114 via a serial port interface 2171. In a networked environment, program modules related to the computer system 2100, or portions thereof, may be stored in the remote memory storage device 2190. It is noted that the network connections shown in FIG. 21 are illustrative and other means of establishing a communications link between the computers may be used depending on the specific requirements of an application of the present precision mapping using autonomous devices.

FIG. 22 is a functional block diagram of an illustrative computing device 2205 such as a mobile phone, smartphone, or other computing device including a variety of optional hardware and software components, shown generally at 2202. For example, the computing device 2205 may be utilized in embodiments in which the swarm drones are manually controllable, or for users to view a real-time map of that which is generated by the swarm drone, master drone, and remote server. Any component 2202 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 2204, such as a cellular or satellite network.

The illustrated device 2205 can include a controller or processor 2210 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2212 can control the allocation and usage of the components 2202, including power states, above-lock states, and below-lock states, and provides support for one or more application programs 2214. The application programs can include common mobile computing applications (e.g., image-capture applications, e-mail applications, calendars, contact managers, web browsers, messaging applications), or any other computing application.

The illustrated device 2205 can include memory 2220. Memory 2220 can include non-removable memory 2222 and/or removable memory 2224. The non-removable memory 2222 can include RAM, ROM, Flash memory, a hard disk, or other well-known memory storage technologies. The removable memory 2224 can include Flash memory or a Subscriber Identity Module (SIM) card, which is well known in GSM (Global System for Mobile communications) systems, or other well-known memory storage technologies, such as "smart cards." The memory 2220 can be used for storing data and/or code for running the operating system 2212 and the application programs 2214. Example data can include web pages, text, images, sound files, video data, or other data sets to be sent to and/or received from one or more network servers or other devices via one or more wired or wireless networks.

The memory 2220 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 2205.

The memory 2220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 2205 can support one or more input devices 2230—such as a touchscreen 2232; microphone 2234 for implementation of voice input for voice recognition, voice commands, and the like; camera 2236; physical keyboard 2238; trackball 2240; and/or proximity sensor 2242; and one or more output devices 2250—such as a speaker 2252 and one or more displays 2254. Other input devices (not shown) using gesture recognition may also be utilized in some cases. Other possible output devices (not shown) can include piezoelectric or haptic output devices. Some devices can serve more than one input/output function. For example, touchscreen 2232 and display 2254 can be combined into a single input/output device.

A wireless modem 2260 can be coupled to an antenna (not shown) and can support two-way communications between the processor 2210 and external devices, as is well understood in the art. The modem 2260 is shown generically and can include a cellular modem for communicating with the mobile communication network 2204 and/or other radio-based modems (e.g., Bluetooth 2264 or Wi-Fi 2262). The wireless modem 2260 is typically configured for communication with one or more cellular networks, such as a GSM network for data and voice communications within a single cellular network, between cellular networks, or between the device and a public switched telephone network (PSTN).

The device can further include at least one input/output port 2280, a power supply 2282, a satellite navigation system receiver 2284, such as a GPS receiver, an accelerometer 2296, a gyroscope (not shown), and/or a physical connector 2290, which can be a USB port, IEEE 1394 (FireWire) port, and/or an RS-232 port. The illustrated components 2202 are not required or all-inclusive, as any components can be deleted and other components can be added.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. A method which utilizes a fifth generation (5G) network including fixed infrastructure providing backhaul access to a wide area network for precision mapping of a physical environment using a plurality of swarm drones, comprising:

traversing the physical environment with the plurality of swarm drones;

using one or more sensors respectively coupled to each of the swarm drones, scanning the physical environment to generate environmental data that is associated with a given location in the physical environment;

communicating with a remote master drone over respective one or more network links in real time, the communications including the generated environmental data;

enabling the remote master drone to determine respective current locations of one or more of the swarm drones using the communications over the 5G network links, wherein the remote master drone is arranged to communicate with the fixed 5G infrastructure and is further arranged as a mobile 5G access point for the plurality of the swarm drones;

deploying the plurality of swarm drones within the physical environment to enable utilization of redundant localization and environmental data to thereby increase precision and confidence in the generated environmental data on a per-location basis within the physical environment; and adjusting a configuration of the 5G network by changing locations of one or more master drones relative to the swarm drones to thereby improve location detection of the one or more swarm drones by the remote master drone.

2. The method of claim 1, in which the environmental data is utilized to build a map of the physical environment.

3. The method of claim 2, in which the swarm drones are in communication with a plurality of 5G access points, and the method further comprises:

determining a Time of Arrival (ToA) for signals received from the respective swarm drones at one or more access points of the plurality of access points;

using the ToA to determine the location for the respective swarm drones in the physical environment; and building the map of the physical environment using the determined location from the ToA determination.

4. The method of claim 3, in which the 5G access points are incorporated into one or more master drones, each master drone being configured to be dynamically repositionable with respect to the physical environment.

5. The method of claim 1, in which the physical environment is a defined space, and an outer environment is the environment outside of the physical environment, and one or both of the physical environment or outer environment include a plurality of access points which provide 5G network connectivity and are in communication with the swarm drones, and the plurality of access points triangulate the location of the respective swarm drones based on the swarm drones' detected distance to each access point.

6. The method of claim 1, in which the one or more sensors used by the swarm drones include a global positioning system, air quality sensor, ultraviolet light detector, camera, thermometer, magnetometer, microphone, carbon monoxide detector, smoke detector, altimeter, inertial measurement unit, proximity sensor, barometer, light sensor, or depth sensor.

7. The method of claim 1, in which the deploying is performed using autonomous operations of one or more of the swarm drones, controlled operations of one or more swarm drones, or combinations of autonomous and controlled operations.

8. The method of claim 7, in which the controlled operations are responsive to control signals received from a master drone.

9. One or more hardware-based non-transitory computer-readable memory devices storing instructions which, when executed by one or more processors disposed in a mobile master drone, cause the master drone to:

be deployed in an ad-hoc fifth generation (5G) network, in which the master drone utilizes a 5G radio transceiver configured for communications with a mobile swarm drone and at least one 5G cell having a fixed position;

identify a location for the master drone based on communications exchanged between the master drone and the at least one 5G cell;

dynamically identify locations for the swarm drone relative to the master drone as the swarm drone traverses a physical space, the swarm drone being configured for communications with the master drone over the ad-hoc 5G network, and the locations being identified using the communications; and generate a spatial map of the physical environment using the dynamically identified locations for the swarm drone, in which a deployment configuration of the ad-hoc 5G network is adjusted so that locations of the master drone are changed to improve location detection characteristics for the swarm drone, the detection characteristics including time of arrival, direction of arrival, line of sight, and triangulation.

10. The one or more hardware-based non-transitory computer-readable memory devices of claim 9, in which the generated spatial map includes information obtained through sensors coupled to the swarm drone, and each piece of information is associated with a dynamically identified location for the swarm drone within the physical environment.

11. The one or more hardware-based non-transitory computer-readable memory devices of claim 10, in which the information obtained from the swarm drone is either utilized or disregarded when confidence of the location of the swarm drone satisfies or fails to satisfy a threshold, respectively.

12. The one or more hardware-based non-transitory computer-readable memory devices of claim 9, in which a deployment configuration of the ad-hoc 5G network is adjusted so that locations of the master drone are changed to maintain a functional range with the swarm drone as the swarm drone traverses the physical environment.

13. One or more hardware-based non-transitory computer-readable memory devices storing instructions which, when executed by one or more processors disposed in a mobile master drone, cause the master drone to:

be deployed in an ad-hoc fifth generation (5G) network, in which the master drone utilizes a 5G radio transceiver configured for communications with a mobile swarm drone and at least one 5G cell having a fixed position;

identify a location for the master drone based on communications exchanged between the master drone and the at least one 5G cell;

dynamically identify locations for the swarm drone relative to the master drone as the swarm drone traverses a physical space, the swarm drone being configured for communications with the master drone over the ad-hoc 5G network, and the locations being identified using the communications; and generate a spatial map of the physical environment using the dynamically identified locations for the swarm drone, in which a deployment configuration of the ad-hoc 5G network is adjusted so that locations of the master drone are changed relative to one or more additional master drones that are operated on the ad-hoc 5G network to improve location detection for the swarm drone.

14. The one or more hardware-based non-transitory computer-readable memory devices of claim 13, in which a deployment configuration of the ad-hoc 5G network is adjusted so that locations of the master drone are changed in which the master drone adjusts its location relative to the one or more additional master drones to improve triangulation of the swarm drone.

15. The one or more hardware-based non-transitory computer-readable memory devices of claim 13, further comprising a plurality of swarm drones which generate and transmit sensor data to the master drone or the one or more additional master drones, and the master drone receives the sensor data from the one or more additional master drones to consolidate the sensor data and individually generate the spatial map.

16. A computing device configured as a mobile master drone, comprising:
   a 5G network interface;
   one or more processors; and
   one or more hardware-based non-transitory memory devices storing computer-readable instructions which, when executed by the one or more processors cause the computing device to:
      establish an ad-hoc 5G network with a swarm of drones;
      receive sensor data over the ad-hoc 5G network collected from a drone in the swarm using 5G specific technology in real time as the swarm drone traverses a physical environment;
      identify a location of the swarm drone that corresponds with each received instance of real-time sensor data using the 5G specific technology in real time;
      adjust a configuration of the ad-hoc 5G network by changing a location of the mobile master drone to improve location detection characteristics for the swarm drone, the detection characteristics including time of arrival, direction of arrival, line of sight, and triangulation;
      store the received real-time sensor data and the corresponding location for each instance of real-time sensor data; and
      generate a map of the physical environment using the stored real-time sensor data and corresponding locations.

17. The computing device of claim 16, in which the swarm drone location is determined in real time using the 5G specific technology based on communications between the swarm drone and the computing device, and further utilizing the determined location to generate a sensor position for the sensor data based on a type of sensor utilized.

18. The computing device of claim 17, in which when the utilized sensor operates locally to the swarm drone such that the sensor position is co-located with the utilized sensor.

19. The computing device of claim 17, in which when the utilized sensor scans the physical environment, the sensor position being determined using a complimentary sensor that operates in conjunction with the utilized sensor, in which the complimentary sensor identifies the location of a structure using the scanning.

* * * * *